(12) United States Patent
Luo et al.

(10) Patent No.: US 11,724,250 B2
(45) Date of Patent: Aug. 15, 2023

(54) METATHESIS CATALYST SYSTEM FOR POLYMERIZING CYCLOOLEFINS

(71) Applicant: ExxonMobil Chemical Patents Inc., Baytown, TX (US)

(72) Inventors: Lubin Luo, Houston, TX (US); Edward J. Blok, Huffman, TX (US); Alan A. Galuska, Huffman, TX (US); Anupriya Jain, Pearland, TX (US); Alexander V. Zabula, Houston, TX (US); Yen-Hao Lin, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 692 days.

(21) Appl. No.: 16/575,800

(22) Filed: Sep. 19, 2019

(65) Prior Publication Data

US 2020/0094233 A1 Mar. 26, 2020

Related U.S. Application Data

(60) Provisional application No. 62/733,989, filed on Sep. 20, 2018.

(51) Int. Cl.
*B01J 31/22* (2006.01)
*C08G 61/08* (2006.01)

(52) U.S. Cl.
CPC ......... *B01J 31/2213* (2013.01); *C08G 61/08* (2013.01); *B01J 2231/14* (2013.01);
(Continued)

(58) Field of Classification Search
None
See application file for complete search history.

(56) References Cited

U.S. PATENT DOCUMENTS 3,549,607 A 12/1970 Natta et al.
3,607,853 A 9/1971 Oberkirch et al.
(Continued)

FOREIGN PATENT DOCUMENTS

EP 0864595 9/1998
GB 1389979 4/1975
(Continued)

OTHER PUBLICATIONS

Rhers et al. Organometallics, 25, 3554-3557 (Year: 2006).*
(Continued)

*Primary Examiner* — Yun Qian

(57) ABSTRACT

A supported catalyst system is based on a transition metal carbene including the moiety $M1=CR^*)_2$, wherein $M^1$ is the transition metal and $R^*$ is hydrogen or a $C_1$-$C_8$ hydrocarbyl. The catalyst system can be supported on a metal oxide support such as silica or the catalyst can be self-supporting. Methods of making the catalyst system can involve precursors based on and/or reacted with aluminum alkyls, halides, and/or alkoxides. Methods of polymerizing cyclic olefins with the catalyst system can obtain polyalkenamers, cyclic olefin polymers, cyclic olefin copolymers, and other metathesis reaction products. The supported catalyst and/or monomer can be recovered and recycled to the polymerization reactor.

2 Claims, 2 Drawing Sheets

(52) U.S. Cl.
CPC ...... *B01J 2231/543* (2013.01); *B01J 2531/50* (2013.01); *B01J 2531/60* (2013.01); *C08G 2261/418* (2013.01)

(56) References Cited

U.S. PATENT DOCUMENTS

| | | | |
|---|---|---|---|
| 3,804,803 | A | 4/1974 | Streck et al. |
| 3,816,382 | A | 6/1974 | Streck et al. |
| 3,816,384 | A | 6/1974 | Streck et al. |
| 3,836,593 | A | 9/1974 | Streck et al. |
| 3,968,180 | A | 7/1976 | Kupper et al. |
| 4,239,874 | A | 12/1980 | Ofstead et al. |
| 5,115,041 | A | 5/1992 | Tenney et al. |
| 8,889,806 | B2 | 11/2014 | Tsunogae et al. |
| 2008/0234451 | A1 | 9/2008 | Kenwright et al. |
| 2016/0122375 | A1 | 5/2016 | Coperet et al. |
| 2016/0175829 | A1 | 6/2016 | Bergens et al. |
| 2016/0236185 | A1 | 8/2016 | Frater et al. |
| 2018/0127539 | A1 | 5/2018 | Tuba et al. |

FOREIGN PATENT DOCUMENTS

| | | |
|---|---|---|
| GB | 2005280 | 4/1979 |
| WO | 1995/001388 | 1/1995 |

OTHER PUBLICATIONS

Weiss et al. Angew. Chem. Int. Ed. Engl., 28, 62-64 (Year: 1989).*
Natta, G., et al. (1964) "Stereospecific Heomopolymerization of Cyclopentene," Angew. Chem. Int. Ed. Engl., v.3(11), 1964, pp. 723-729.
Schrock, R. R. et al. (2003) "Molybdenum and Tungsten Imido Alkylidene Complexes as Efficient Olefin Metathesis Catalysts," Angewandte Chemie International Edition, v.42, pp. 4592-4633. https://doi.org/10.1002/anie.200300576.
Schrock, Richard R. (2004) "Recent Advances in Olefin Metathesis by Molybdenum and Tungsten Imido Alkylidene Complexes," Journal of Molecular Catalysis A: Chemical, v213(1), pp. 21-30, ISSN 1381-1169,https://doi.org/10.1016/j.molcata.2003.10.060.
Buchmeiser, Michael R. (2009) "Polymer-Supported Well-Defined Metathesis Catalysts," Chemical Reviews, v.109(2), pp. 303-321, https://pubs.acs.org/appl/literatum/publisher/achs/journals/content/chreay/2009/chreay.2009.109.issue-2/cr800207n/production/cr800207n.fp.png_v03.
Novak B. M. et al. (1992) "The Development of Well-Defined Catalysts for Ring-Opening Olefin Metathesis Polymerizations (ROMP). In: Polymer Synthesis Oxidation Processes," Advances in Polymer Science, v.102, pp. 48-71. Springer, Berlin, Heidelberg, https://doi.org/10.1007/3-540-55090-9_2.
Hamieh, Ali et al. (2016) "Investigation of Surface Alkylation Strategy in SOMC: In Situ Generation of a Silica-Supported Tungsten Methyl Catalyst for Cyclooctane Metathesis," Organometallics v.35, pp. 2524-2531.
Mougel, Victor et al. (2015) "Isostructural Molecular and Surface Mimics of the Active Sites of the Industrial WO 3 /Si0 2 Metathesis Catalysts," ACS Catasysis, v.5(11), pp. 6436-6439.
Allen, Daryl P. (2015) "Supported Catalysts and Nontraditional Reaction Media," Handbook of Metathesis, v.1. https://onlinelibrary.wiley.com/doi/book/10.1002/9783527674107.
Blanc, F. et al. (2008) "Dynamics of Silica-Supported Catalysts Determined by Combining Solid-State NMR Spectroscopy and DFT Calculations," *J. Am. Chem. Soc.*, v.130, pp. 5886-5900.
Safronova, A. et al. (2009) "Synthesis, Structure, and Catalytic Properties of Heteroelement Carbene Tungsten Complexes $Ph_3ECH=W(OBu-t)_2(OPh)_2$ (E+Si,Ge)," *Ru. Jrnl. Gen. Chem.*, v. 79(9), pp. 1825-1830.

* cited by examiner

METATHESIS CATALYST SYSTEM FOR POLYMERIZING CYCLOOLEFINS

CROSS REFERENCE TO RELATED APPLICATION

This application claims priority to Provisional Application No. 62/733,989, filed Sep. 20, 2018, the disclosure of which is incorporated herein by reference.

This application is related to concurrently filed U.S. Ser. No. 62/733,993 entitled Metathesis Catalyst System for Polymerizing Cycloolefins.

BACKGROUND

The active species of Ziegler-Natta ("ZN") type metathesis polymerization catalyst for cycloolefin polymerization (Natta, G., et al. (1964) *Angew. Chem. Int. Ed. Engl.*, v.3(11), 1964, pp. 723-729) have been formed in-situ by adding in sequence a metal compound such as $WCl_6$, an alkoxide regulation ligand precursor such as a substituted aromatic alcohol, and an activator such as $AlEt_3$. These catalysts may have an undefined structure, resulting in uncontrollable, non-reproducible processes and polymers having undesirable molecular weight distributions, stereo-selectivity (trans:cis ratio), and the like. Polymerization activity can be low due to dilution, an inefficient environment for catalyst activation, and/or generation of catalyst poisons such as HCl or $Cl_2$, which are also hazardous.

Commercial scaling of cycloolefin polymerization is very challenging. Homogeneous ZN processes require the addition of a diluent quench, often ethanol, to stop polymerization, precipitate the product, and separate it from catalyst residue, which can result in an unusable, discolored product. Recovery and recycle of monomer and catalyst are difficult.

U.S. Pat. No. 3,607,853 discloses a three-component catalyst system, $WCl_6$, t-BuOCl, and $AliBu_3$, sequentially added to cyclopentene benzene solution that generates $Cl_2$:

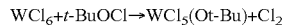

and forms undefined tungsten carbene compounds.

GB 1,389,979 discloses another three-component catalyst system, $WCl_6$, 2-iPrPhOH or 2,6-diiPrPhOH, and $AlMeCl_2$:

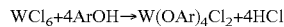

This catalyst is prepared in a separate container followed by heating 100° C. to remove HCl, and then added to the cyclopentene nearly neat with the activator $AlEtCl_2$ in a small amount of chlorobenzene solvent, presumably following the reaction below:

where ArOH is 2-iPrPhOH or 2,6-diiPrPhOH and x=0-5.5.

An example of the quench that these homogenous systems require to avoid Mw changes and discoloration during product isolation is disclosed in U.S. Pat. No. 3,607,853, where roughly 9 kg benzene were used for reaction, another 1 kg benzene with ethanol used for quenching, and 24 kg ethanol used to isolate 1.4 kg product. Such processes are laborious, non-reproducible, and generally not cost effective.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a catalyst system comprising an isolated single-site like catalyst compound which can be prepared in advance of cycloolefin polymerization and may allow for control of activity, stereo-selectivity, and Mw/PDI of the polymer. Catalysts disclosed herein include catalysts constructed on silica or other supported materials containing surface OH groups. Further disclosed herein are methods to form the catalyst without producing catalytic poisons or other hazardous materials, and methods for cycloolefin polymerization using these catalysts which do not require a quench/isolation step, produce polymer product free of catalyst residue, and allow recycle of monomer, catalyst, and/or solvent to the polymerization step.

In embodiments according to the instant invention a supported ZN catalyst comprises a transition metal carbene comprising the moiety $M^1=C(R^*)_2$, typically $M^1=CHR^*$, wherein $M^1$ is a transition metal and $R^*$ is hydrogen or a $C_1$-$C_8$ hydrocarbyl. Also, a cyclic olefin polymerization process comprises contacting the supported ZN catalyst with a $C_4$-$C_{20}$ cyclic olefin monomer in a polymerization reactor under conditions sufficient to form a reaction product mixture comprising a polymer, monomer, supported ZN catalyst, and optionally a solvent; recovering the polymer, the supported ZN catalyst, and optionally the solvent from the reaction product mixture; and recycling at least a portion of the recovered catalyst, monomer, and optionally the solvent to the polymerization reactor.

DETAILED DESCRIPTION

Figure 1:
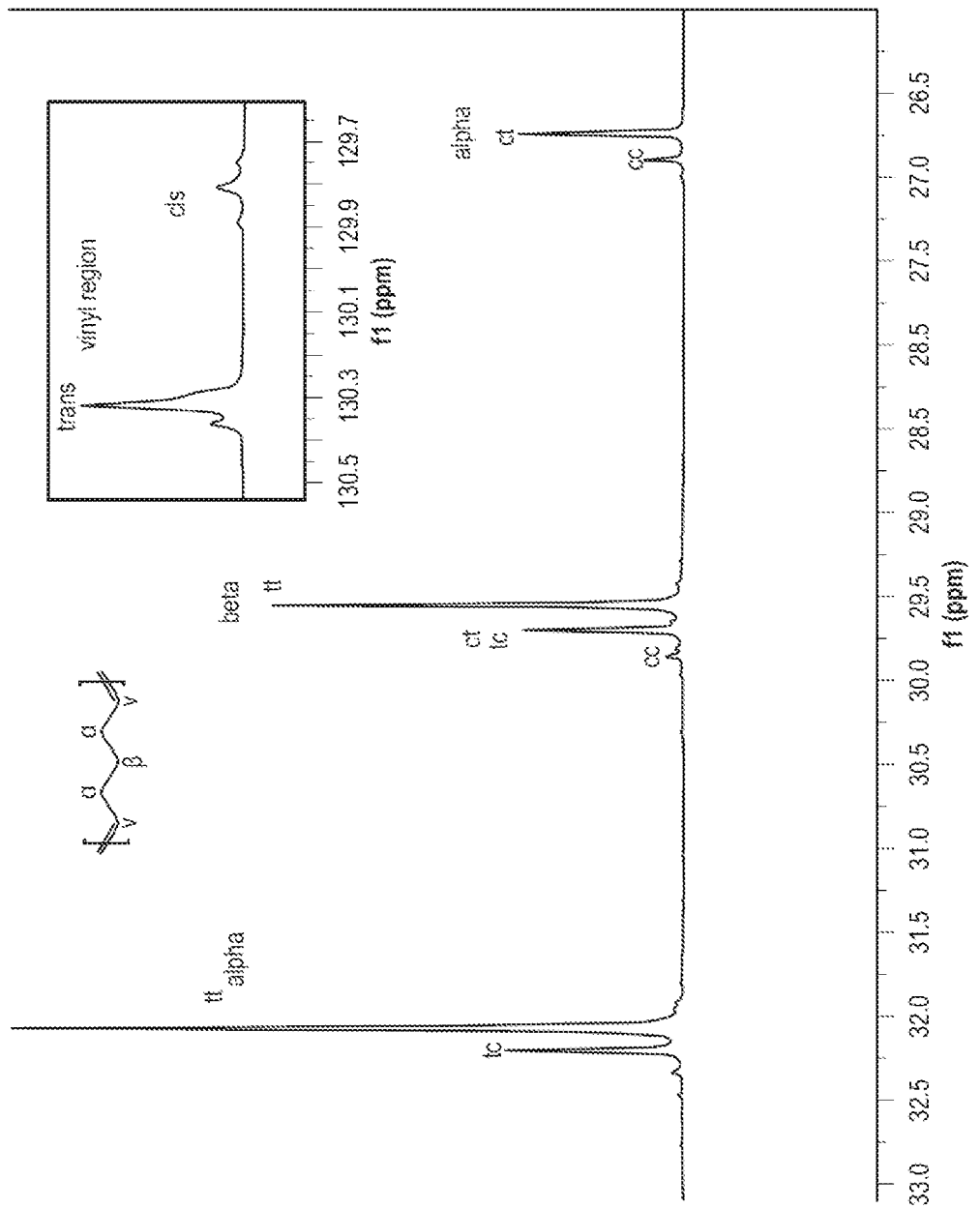
FIG. 1 is an exemplary $^{13}C$ NMR spectrum showing the chemical shift assignments of an exemplary cyclopentene polymer.

The term "alkyl" or "alkyl group" interchangeably refers to a saturated hydrocarbyl group consisting of carbon and hydrogen atoms. An alkyl group can be linear, branched, cyclic, or substituted cyclic.

The term "cycloalkyl" or "cycloalkyl group" interchangeably refers to a saturated hydrocarbyl group wherein the carbon atoms form one or more ring structures.

The term "aryl" or "aryl group" interchangeably refers to a hydrocarbyl group comprising an aromatic ring structure therein.

For the purposes of this disclosure and the claims thereto, the new numbering scheme for the Periodic Table Groups is used as in *Chem. Eng. News*, (1985), v. 63, pg. 27. Therefore, a "Group 4 metal" is an element from Group 4 of the Periodic Table.

Unless otherwise indicated, a substituted group means such a group in which at least one atom is replaced by a different atom or a group. Thus, a substituted alkyl group can be an alkyl group in which at least one hydrogen atom is replaced by a hydrocarbyl group, a halogen, any other non-hydrogen group, and/or a least one carbon atom and hydrogen atoms bonded thereto is replaced by a different group. Preferably, a substituted group is a radical in which at least one hydrogen atom has been substituted with a heteroatom or heteroatom containing group, preferably with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

For purposes herein, "heteroatom" refers to non-metal or metalloid atoms from Groups 13, 14, 15 and 16 of the periodic table, typically which supplant a carbon atom. For example, pyridine is a heteroatom containing form of benzene. Halogen refers to atoms from group 17 of the periodic table.

The terms "hydrocarbyl radical," "hydrocarbyl group," or "hydrocarbyl" interchangeably refer to a group consisting of hydrogen and carbon atoms only. A hydrocarbyl group can be saturated or unsaturated, linear, branched, cyclic or acyclic, aromatic or non-aromatic.

Substituted hydrocarbyl radicals are radicals in which at least one hydrogen atom has been substituted with a heteroatom or heteroatom containing group, preferably with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The term "$C_n$" group or compound refers to a group or a compound comprising carbon atoms at total number thereof of n. Thus, a "$C_m$-$C_n$" group or compound refers to a group or compound comprising carbon atoms at a total number thereof in the range from m to n. Thus, a $C_1$-$C_{50}$ alkyl group refers to an alkyl group comprising carbon atoms at a total number thereof in the range from 1 to 50.

The term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic.

For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. An oligomer is a polymer having a low molecular weight, such as an Mn of 21,000 g/mol or less (preferably 10,000 g/mol or less), and/or a low number of mer units, such as 100 mer units or less (preferably 75 mer units or less).

The term "cyclic olefin" refers to any cyclic species comprising at least one ethylenic double bond in a ring. The atoms of the ring may be optionally substituted. The ring may comprise any number of carbon atoms and/or heteroatoms. In some cases, the cyclic olefin may comprise more than one ring. A ring may comprise at least 3, at least 4, at least 5, at least 6, at least 7, at least 8, or more, atoms. Non-limiting examples of cyclic olefins include cyclopentene, cyclohexene, norbornene, dicyclopentadiene, bicyclo compounds, oxabicyclo compounds, and the like, all optionally substituted. "Bicyclo compounds" are a class of compounds consisting of two rings only, having two or more atoms in common.

Unless specified otherwise, the term "substantially all" with respect to a molecule refers to at least 90 mol % (such as at least 95 mol %, at least 98 mol %, at least 99 mol %, or even 100 mol %).

Unless specified otherwise, the term "substantially free of" with respect to a particular component means the concentration of that component in the relevant composition is no greater than 10 mol % (such as no greater than 5 mol %, no greater than 3 mol %, no greater than 1 mol %, or about 0%, within the bounds of the relevant measurement framework), based on the total quantity of the relevant composition.

The terms "catalyst" and "catalyst compound" are defined to mean a compound capable of initiating catalysis and/or of facilitating a chemical reaction with little or no poisoning/ consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material, where the system can polymerize monomers to form polymer.

All numerical values within the detailed description and the claims herein are modified by "about" or "approximately" the indicated value, and take into account experimental error and variations that would be expected by a person having ordinary skill in the art.

In the present disclosure, unless specified otherwise, percent refers to percent by weight, expressed as "wt %."

In the present disclosure, all molecular weight data are in the unit of g·mol$^{-1}$. Unless indicated otherwise, molecular weight of oligomer or polymer materials and distribution thereof in the present disclosure are determined using gel permeation chromatography employing a Tosoh EcoSEC High Temperature GPC system (GPC-Tosoh EcoSEC; Tosoh Bioscience LLC). GPC was used to determine the polypentenamer Mw, Mn and Mw/Mn using the high temperature gel permeation chromatograph equipped with a differential refractive index detector (DRI). Three high temperature TSK gel column (Tosoh GMHHR-H(20)HT2) were used. The nominal flow rate was 1.0 mL/min, and the nominal injection volume was 300 μL. The various transfer lines, columns, and dual flow differential refractometer were contained in an oven maintained at 160° C. The mobile phase Solvent for the experiment is prepared by dissolving 1.2 grams of butylated hydroxytoluene as an antioxidant in 4 liters of Aldrich reagent grade 1,2,4 trichlorobenzene (TCB). The TCB mixture was then filtered through a 0.1 μm teflon filter. The TCB was then degassed with an online degasser before entering the GPC instrument.

The polydispersity index (PDI), also referred to as the molecular weight distribution (MWD), of the material is then the ratio of Mw/Mn.

For purposes herein, the polymer trans:cis ratio was measured with a standard $^{13}$C NMR techniques according to methods known in the art. Samples were prepared with 66.67 mg/ml of CDCl$_3$ (deuterated chloroform) in a 10 mm tube. The $^{13}$C NMR spectra were measured on a Bruker 600 MHz cryoprobe with inverse gated decoupling, 20 s delay, 90° pulse, and 512 transients. Assignments were based on assignments from O. Dereli et al. (2006) *European Polymer Journal*, v. 42, pp. 368-374. Three different positions were used for calculation of the trans/cis composition:

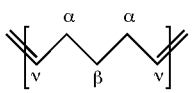

1. vinyl peaks with trans at 130.3 ppm and cis at 129.8 ppm;
2. alpha position trans/cis (tc) at 32.2 ppm, trans/trans (tt) at 32.07 ppm, cis/cis (cc) at 26.9 ppm and cis/trans (ct) at 26.74 ppm;
3. beta position cis/cis (cc) at 29.86 ppm, cis/trans (trans/cis) (ct+tc) at 29.7 ppm and trans/trans (tt) at 29.54 ppm;
4. Trans=tt+0.5*(ct+tc); and
5. Cis=cc+0.5*(ct+tc).

The calculation for each of groups 1-3 above (i.e., vinyl, alpha, and beta) were averaged to get an average trans and cis composition. An exemplary $^{13}$C NMR spectra is shown in FIG. 1.

For purposes herein, small scale polymerization conversion rates were monitored and estimated with $^1$H NMR method using a Bruker 400 MHz instrument, as indicated. Pulse program zgcw30 was used with D1=60 s and ns=2 or 4. CDCl$_3$ was the lock solvent. The chemical shift of cyclopentene monomer double bond protons was measured to be about 5.75 ppm and the chemical shift of polypentenamer double bond protons was experimentally determined to be about 5.53 ppm. Integral from 5.45 to 6.00 ppm ($I_{m+p}$) was used to cover the two chemical shifts, which was then set to 100% to represent total cyclopeneten. The integral from 4.55 to 5.60 ppm ($I_{P+RS}$) is assigned the polypentenamer overlap with the right $^{13}$C satellite chemical shift of cyclopentene. To substrate the $^{13}$C satellite contribution from the overlapped integral, the similar intensity left $^{13}$C satellite of cyclopentene was integrated from 5.93 to 5.97 ppm ($I_{LS}$) and the conversion C calculated as follows:

$$C=(I_{P+RS}-I_{LS})/I_{m+p}.$$

Appropriate $^{13}$C decoupling program was identified when the $I_{LS}$ was found to be zero.

The following abbreviations may be used through this specification: Bu is butyl, nBu is normal butyl, iBu is isobutyl, tBu is tertiary butyl, ptBu is para-tertiary butyl, Et is ethyl, Me is methyl, pMe is para-methyl, PDI is polydispersity index (Mw/Mn) Ph is phenyl, Pr is propyl, iPr is isopropyl, n-Pr is normal propyl, RT is room temperature (i.e., approximately 23° C.), THF is tetrahydrofuran, and tol is toluene.

In embodiments according to the instant invention, a cyclic olefin polymerization process comprises contacting a supported ZN catalyst with a $C_4$-$C_{20}$ cyclic olefin monomer in a polymerization reactor under conditions sufficient to form a reaction product mixture comprising a polymer, monomer, catalyst, and optionally a solvent; recovering the polymer, the supported ZN catalyst, and optionally the solvent from the reaction product mixture; and recycling at least a portion of the recovered catalyst, unreacted cyclic olefin monomer, and optionally the solvent to the polymerization reactor, the supported catalyst comprising a transition metal carbene comprising the moiety $M^1$=CHR*, wherein $M^1$ is a transition metal, preferably a Group 5 or Group 6 metal of the periodic table, and R* is hydrogen or a $C_1$-$C_8$ hydrocarbyl.

In embodiments the process further comprises contacting a supported ZN catalyst precursor with an alkyl aluminum activator having the general formula $AlR*_r(Y)_{3-r}$ wherein R* is a $C_1$-$C_8$ alkyl, each Y is hydrogen, halogen, or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and r is 1 to 3, to form the supported ZN catalyst comprising the carbene moiety $M^1$=CHR*, wherein $M^1$ is the transition metal, preferably a Group 5 or Group 6 metal of the periodic table, and R* is hydrogen or a $C_1$-$C_8$ hydrocarbyl prior to, or in-situ with, the $C_4$-$C_{20}$ cyclic olefin monomer in a polymerization reactor under conditions sufficient to form a reaction product mixture comprising the polymer, monomer, catalyst, and optionally a solvent.

The supported catalyst may be any of the supported catalysts described herein. Preferably, the polymerization comprises ring opening metathesis polymerization and the polymer comprises polyalkenamer such as polypentenamer. The polymer may also comprise a cyclic olefin copolymer and/or a cyclic olefin polymer.

In one or more embodiments of the invention, the supported ZN catalyst comprises moieties having the general formulae (F5), (F6), or a combination thereof:

(F5)

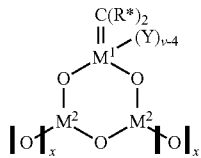

(F6)

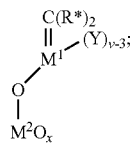

where $M^1$ is a Group 5 or a Group 6 metal of the periodic table of valence v;

each $R^*$ is independently hydrogen or a $C_1$ to $C_8$ alkyl radical;

each Y is hydrogen, halogen or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and $M^2O_x$ is a metal oxide support selected from silica, zeolite, alumina, titania, zirconia, clay, magnesium oxy compounds, or a combination thereof.

In one or more embodiments of the invention, the active sites of the supported ZN catalyst preferably consist of, or consist essentially of, moieties having the general formulae (F5).

In one or more embodiments of the invention, the active sites of the supported ZN catalyst preferably consist of, or consist essentially of, moieties having the general formulae (F6).

In one or more embodiments of the invention, the process may preferably further comprise contacting a supported ZN precatalyst slurried in the $C_4$-$C_{20}$ cyclic olefin monomer with an alkyl aluminum activator to form a reaction product mixture comprising the activated ZN catalyst from the slurry, wherein the supported precatalyst comprises the general formulae (F3), (F4), or a combination thereof:

(F3)

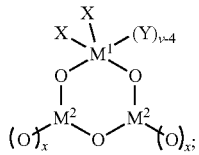

(F4)

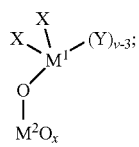

where $M^1$ is a Group 5 or a Group 6 metal of the periodic table of valence v; each X is halogen; each Y is hydrogen, halogen or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and $M^2O_x$ is a metal oxide support selected from silica, alumina, titania, or a combination thereof; the alkyl aluminum activator having the general formula $AlR_r(Y)_{3-r}$, wherein R is a $C_1$-$C_8$ alkyl, each Y is hydrogen, halogen, or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and r is 1 to 3.

In one or more embodiments of the invention, $M^2O_x$ is preferably silica or zeolite, and the process may further comprise:

i) heat treating the silica support at a temperature below about 500° C. (preferably from 100° C. to 500° C.) to form chelating hydroxyl groups on a surface of the silica support comprising moieties having the general formula (Ia):

(Ia)

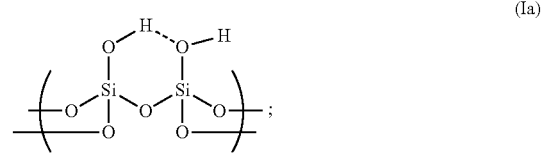

ii) preferably to eliminate catalyst poisoning, equipment erosive, and non-environmentally friendly byproducts, e.g., HCl and/or $Cl_2$, contacting the heat-treated silica with $M^I R^*$, $M^{II} R^* Z'$, or $M^{III} R^* Z'_2$, where $M^I$ is a Group 1 metal, preferably Li, Na, or K; $M^{II}$ is a Group 2 metal, preferably Mg or Ca; and $M^{III}$ is Group 13 metal, preferably Al or Ga; each $R^*$ is independently H or a $C_1$-$C_8$ alkyl and each $Z'$ is independently hydrogen, halogen, or $C_1$-$C_8$ alkyl radical, to form a first intermediate comprising moieties having the general formula (Ia1), (Ia2), or (Ia3).

(Ia1)

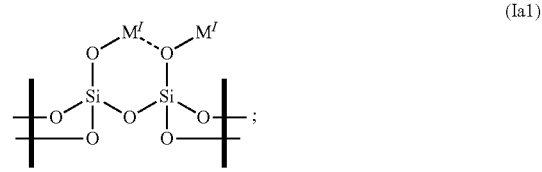

(Ia2)

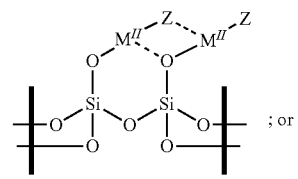

; or (Ia3)

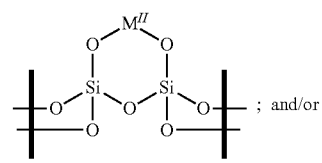

; and/or wherein each Z is independently halogen or $C_1$-$C_8$ alkyl radical;

iii) contacting Ia and/or at least one of the first intermediates Ia1, Ia2, or Ia3 with $M^1X_2Y_{(v-2)}$ to form a second intermediate comprising moieties having the general formula (IIa):

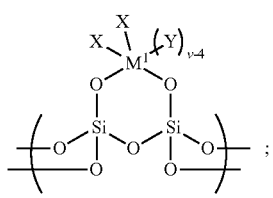

(IIa)

where $M^1$ is a Group 5 or a Group 6 metal of the periodic table having valance v;
each X is a halogen;
each Y is independently hydrogen, a halogen, or —$OR^5$, wherein $R^5$ is independently a $C_1$-$C_{20}$ hydrocarbyl radical, optionally when present, two or more of $R^5$ join together to form a ring having 40 or less atoms from Groups 14, 15, and/or 16 of the periodic table; and iv) contacting the second intermediate with the alkyl aluminum activator to form the corresponding activated carbene containing supported ZN catalyst, the alkyl aluminum activator having the general formula $AlR_r(Y)_{3-r}$ wherein R is a $C_1$-$C_8$ alkyl, each Y is hydrogen, halogen, or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and r is 1 to 3, to form the reaction product mixture from the slurry.

In other embodiments of the invention, wherein $M^2O_x$ is preferably silica, the process may preferably comprise:

i) heat treating the silica support at a temperature greater than or equal to about 600° C. (preferably from 600° C. to 1,200° C.) to form isolated hydroxyl groups as the dominate hydroxyl species (i.e., greater than 50% of the available species present on a surface of the silica support) comprising moieties having the general formula Ib:

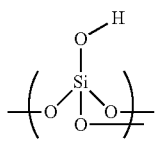

(Ib)

ii) preferably to eliminate the production of catalyst poisoning, equipment erosive, and non-environmentally friendly byproducts, e.g., HCl and/or $Cl_2$ contacting the heat-treated silica with $M^IR*$, $M^{II}R*Z'$, or $M^{III}R*Z'_2$, where $M^I$ is a Group 1 metal, preferably Li, Na, or K; $M^{II}$ is Group 2 metal, preferably Mg or Ca; and $M^{III}$ is Group 13 metal, preferably Al or Ga; each R* is independently hydrogen or a $C_1$-$C_8$ alkyl and each Z' is hydrogen, halogen, or $C_1$-$C_8$ alkyl radical, to form a first intermediate comprising moieties having the general formula (Ib1, Ib2, or Ib3):

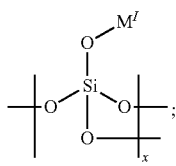

(Ib1)

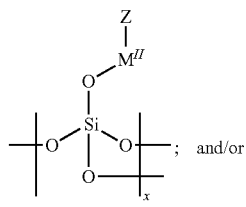

(Ib2)

and/or

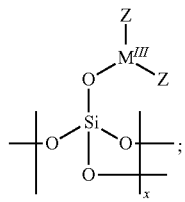

(Ib3)

where each Z is halogen or $C_1$-$C_8$ alkyl radical;

iii) contacting Ib and/or at least one of the first intermediate Ib1, Ib2, and/or Ib3 with $M^1X_2Y_{v-2}$ to form a second intermediate comprising moieties having the general formula (IIb):

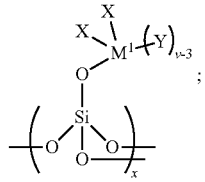

(IIb)

where $M^1$ is a Group 5 or a Group 6 metal of the periodic table having valance v;

each X is a halogen;

each Y is independently hydrogen, a halogen, or —$OR^5$, wherein $R^5$ is independently a $C_1$-$C_{20}$ hydrocarbyl radical, optionally when present, two or more of $R^5$ join together to form a ring having 40 or less atoms from Groups 14, 15, and/or 16 of the periodic table; and iv) contacting the second intermediate with the alkyl aluminum activator to form the reaction product mixture from the slurry.

In embodiments, in which heat treating the silica support is calcined at a temperature greater than or equal to about 600° C. (preferably from 600° C. to 1,200° C.) to form isolated hydroxyl groups dominate species on a surface of the silica support comprising moieties having the general formula:

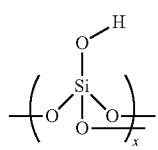

the silica supported catalyst may be prepared by one or more methods according to the following reaction schemes:

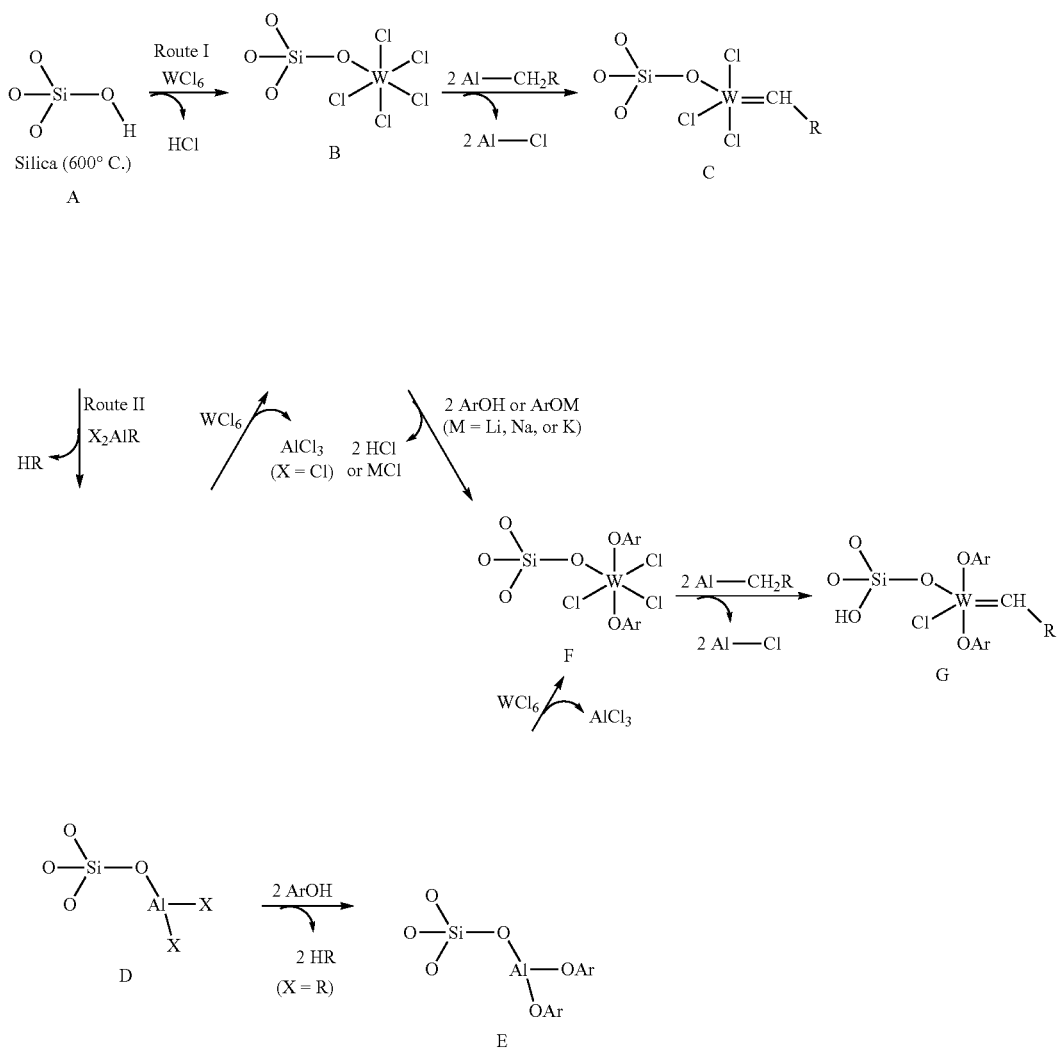

For example, Route I involves intermediates A-B-C. Route II begins with A then forms intermediates D E F and G. As the diagram shows, there are also combinations of pathways to produce supported catalysts according to embodiments of the invention.

Likewise, in embodiments in which heat treating the silica support is at a temperature below about 500° C. (preferably from 100° C. to 500° C.) to form chelating hydroxyl groups dominate species on a surface of the silica support comprising moieties having the general formula:

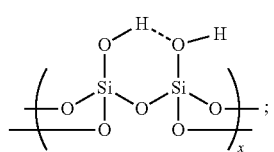

the silica supported catalyst may be prepared by one or more methods according to the following reaction schemes:

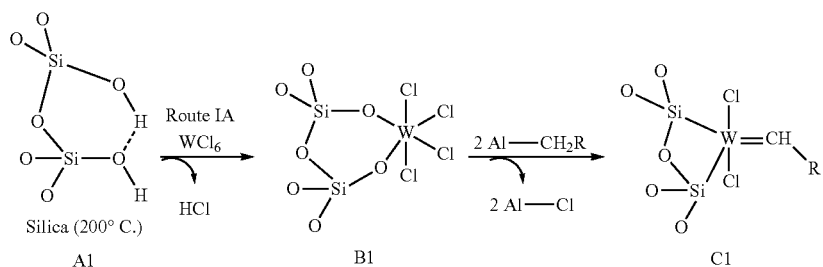

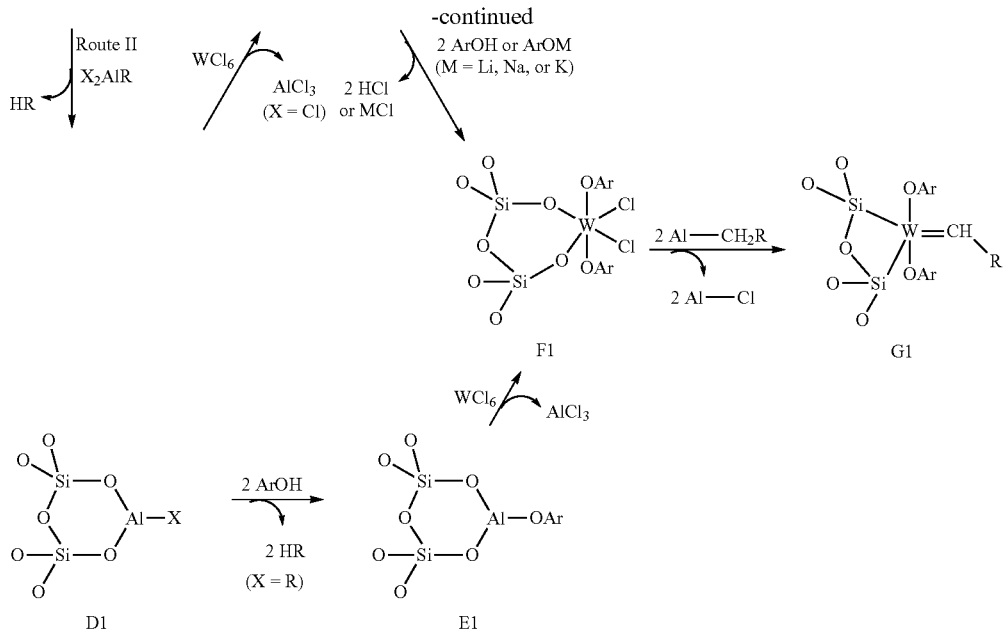

Route IA involves converting silica A1 into intermediate B1, and then into the active catalyst C1. Route IIA begins with silica A1 then forms intermediates D1, E1, and F1, to produce active catalyst G1. As the diagram shows, there are also combinations of pathways to produce supported catalysts according to embodiments of the invention.

In embodiments of the invention, the supported ZN catalyst comprises a random polymeric concatenation of polyvalent moieties selected from two or more of B', C', D', E', F', G', and I' terminated by monovalent moieties A' and/or H' according to the empirical formula (F1):

$$A'_a B'_b C'_c D'_d E'_e F'_f G'_g H'_h I'_i \quad (F1)$$

wherein A' is mono-valent moiety represented by the structure:

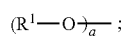

$(R^1—O)_a$ ;

B' is a divalent moiety represented by the structure:

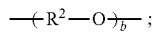

$—(R^2—O)_b—$ ;

C' is a divalent moiety represented by the structure:

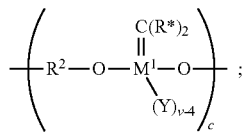

D' is a trivalent moiety represented by the structure:

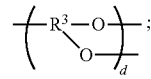

E' is a trivalent moiety represented by the structure:

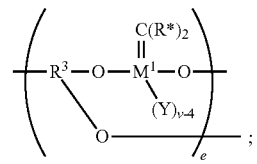

F' is a trivalent moiety represented by the structure:

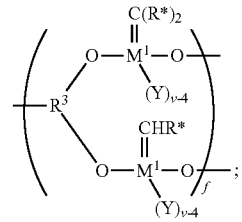

G' is a divalent moiety represented by the structure:

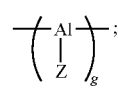

H' is a monovalent moiety represented by the structure:

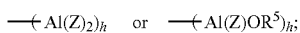

and

I' is represented by the structure:

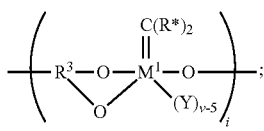

wherein $R^1$, $R^2$, and $R^3$ are independently $C_4$-$C_{20}$ hydrocarbyl radicals comprising carbon and one or more of hydrogen, halogen, O, S, N, and P;

each $R^*$ is independently hydrogen or a $C_1$ to $C_8$ alkyl radical;

each Y is independently hydrogen, halogen, or —$OR^5$, wherein each $R^5$ is $C_1$ to $C_{10}$ alkyl radical;

each Z is independently halogen or $C_1$ to $C_8$ alkyl radical;

$M^1$ is a Group 5 or Group 6 metal of the periodic table;

a, b, c, d, e, f, g, h and i are greater than or equal to 0;

a+h is greater than or equal to 2; and b+c+d+e+f+g+i is greater than or equal to 2; and c+e+f+i is greater than or equal to 1.

In embodiments of the invention $R^2$ may have the general formula:

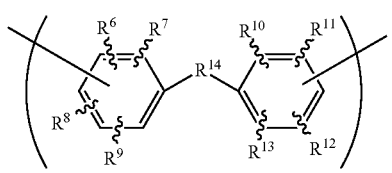

wherein $R^{14}$ is a divalent radical comprising from 1 to 10 atoms selected from Groups 14, 15, and 16 of the periodic table;

in alternative embodiments, the two rings may be directly joined according to the following general formula:

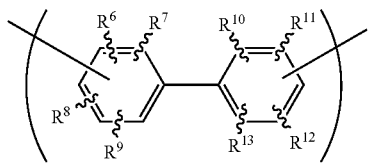

each of $R^6$ through $R^{13}$ are independently hydrogen, monovalent radicals comprising from 1 to 20 atoms selected from Groups 14, 15, 16, and halogen, optionally two or more of $R^6$ through $R^{13}$ join together to form a ring having 40 or less atoms from Groups 14, 15, and/or 16 of the periodic table; and/or $R^3$ may have the general formula:

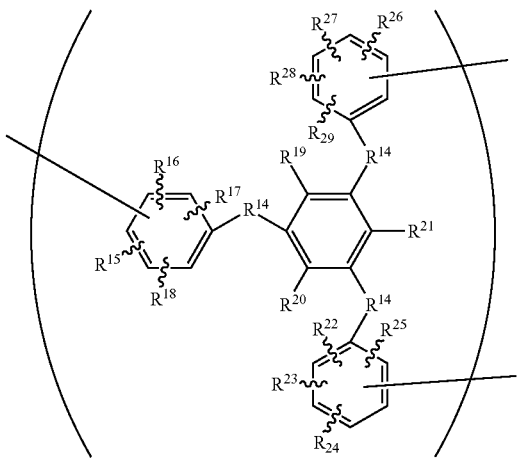

wherein $R^{14}$ is a divalent radical comprising from 1 to 10 atoms selected from Groups 14, 15, and 16 of the periodic table;

each of $R^{15}$ through $R^{29}$ are independently hydrogen, monovalent radicals comprising from 1 to 20 atoms selected from Groups 14, 15, 16, and halogen, optionally two or more of $R^{15}$ through $R^{29}$ join together to form a ring having 40 or less atoms from Groups 14, 15, and/or 16 of the periodic table; and/or $R^1$ may preferably have the formula:

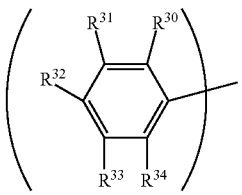

wherein $R^{30}$ through $R^{34}$ are independently monovalent radicals comprising hydrogen, or from 1 to 20 atoms selected from Groups 14, 15, 16, or halogen, or optionally two or more of $R^{30}$ through $R^{34}$ join together to form a ring having 40 or less atoms from Groups 14, 15, and/or 16 of the periodic table.

In one or more embodiments of the invention, preparation of the supported ZN catalyst may preferably comprise:

i) contacting a dihydroxyl compound $R^2(OH)_2$ and/or a tri-hydroxyl compound $R^3(OH)_3$, and optionally a monohydroxyl compound $R^1(OH)$, with an alkyl aluminum compound having the general formula $AlR_2Z'$ where each R is independently a $C_1$-$C_8$ alkyl and Z' is hydrogen, halogen, or $C_1$-$C_8$ alkyl, to form an aluminum centered polymeric intermediate comprising a random polymeric concatenation of divalent moieties B', trivalent moieties D', or a combination thereof, bonded together through the aluminum atoms of G' and optionally terminated by monovalent moieties A', H' or a combination thereof, according to empirical formula:

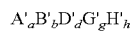

wherein a+h is greater than or equal to 2; and b+d+g is greater than or equal to 2;

ii) contacting the aluminum centered polymeric intermediate with $M^1Y_v$ where $M^1$ is a Group 5 or Group 6 transition metal of the periodic table of valence v, to form a second intermediate according to empirical formula:

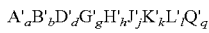

wherein J' is a divalent moiety represented by the structure:

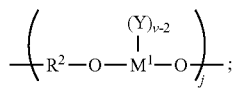

K' is a trivalent moiety represented by the structure:

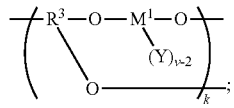

L' is a trivalent moiety represented by the structure:

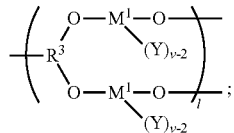

and
Q' is a divalent moiety represented by the structure:

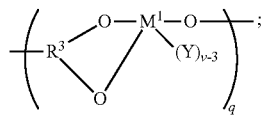

where a+h is greater than or equal to 2; and
b+d+g+j+k+l+q is greater than or equal to 2; and
iii) contacting the second intermediate with an alkyl aluminum activator to form the corresponding activated carbene containing cyclic olefin polymerization catalyst, the alkyl aluminum activator having the general formula $AlR_r(Y)_{3-r}$ wherein R is a $C_1$-$C_8$ alkyl, each Y is hydrogen, halogen, or —$OR^5$, wherein each $R^5$ is independently a $C_1$-$C_{20}$ hydrocarbyl radical, optionally when present, two or more of $R^5$ join to form a ring having 40 or less atoms from Groups 14, 15, and/or 16 of the periodic table; and r is 1 to 3.

In one or more embodiments of the invention, the preparation of the supported ZN catalyst may preferably comprise setting or selecting a relative molar ratio of $R^2(OH)_2$ and $R^3(OH)_3$ and/or the alkyl aluminum compound $AlR**_2Z'$ to control a pore size and/or a particle size of the supported ZN catalyst.

In one or more embodiments of the invention, the transition metal $M^1$ is preferably present in the supported catalyst at from 0.1 wt % to 30 wt %, based on the total amount of supported catalyst present. In embodiments, a molar ratio of transition metal $M^1$ to aluminum ($M^1$:Al) in the supported catalyst is preferably from 1:1000 to 4:10, based on the total number of moles of $M^1$ and aluminum present.

In embodiments, the content of the catalyst metal, e.g., the loading of the tungsten in the above reaction, may be controlled to prevent too high a loading. In embodiments, the transition metal loading may be controlled to achieve a desired activities by employing a metal alkyl such as $MgR_2$ or $AlR_2X$ (X=R or halide; R=$C_1$ to $C_{20}$ alkyl) to replace a portion of the catalyst metal, e.g., $AlR_2X$ according to the following reaction scheme:

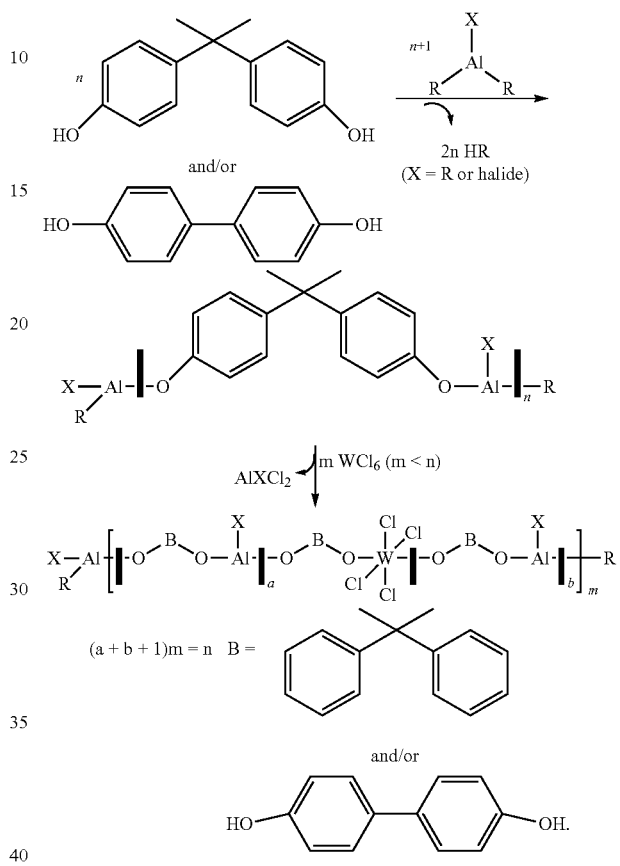

In any embodiment of the invention, the process may preferably further comprise separating the monomer from the reaction product mixture and recycling the monomer to the polymerization reactor; contacting the separated supported ZN catalyst with additional alkyl aluminum activator prior to recycling the supported ZN catalyst to the polymerization reactor; or a combination thereof. In one or more embodiments of the invention, the process is preferably continuous. In one or more embodiments of the invention, the process may preferably further comprise supplying a cyclic diolefin as a comonomer to the polymerization reactor. In embodiments the comonomer comprises norbornene, ethylidene norbornene, dicyclopentadiene, or a combination thereof.

In one or more embodiments of the invention, the polymer is preferably a polyalkenamer and the process may preferably further comprise:
(I) controlling the Mw and/or the trans:cis ratio of the polymer by a) controlling a reactor temperature from −35° C. to 100° C.; b) controlling the amount of monomer recycled to the reactor; c) using the monomer as a reaction solvent; or a combination thereof; and/or
(II) forming the active catalyst species at temperature less than or equal to about 5° C., followed by increasing the reaction temperature to a temperature less than 100° C.; and/or (III) incorporating an amount of an alpha olefin, preferably an alpha-olefin comprising at least one hetero-atom containing functional group into the cyclic olefin monomer to reduce the molecular weight of the polymer. In embodiments, the alpha olefins have the general formula:

$$CH_2=CH-(CH_2)_n-CH_3;$$

$$CH_2=CH-(CH_2)_n-OSiR^{\#}_3; \text{ and/or}$$

$$CH_2=CH-(CH_2)_n-NR^{\#}_2,$$

where n=1-20; $R^{\#}$ is a $C_1$-$C_{10}$ alkyl radical; and/or (IV) employing two or more supported ZN catalysts in the same or different reactors to produce a reaction product mixture comprising a polymer comprising i) a multimodal Mw profile; ii) a trans:cis molar ratio greater than 1, based on the total number of moles of chiral monomeric units incorporated into the polymer; iii) a trans:cis molar ratio less than 1, based on the total number of moles of chiral monomeric units incorporated into the polymer; and/or (V) employing multiple reactors connected in a sequence to produce heterophasic copolymers.

In embodiments, the catalyst system according to the instant disclosure are prepared as an isolated single-site like catalyst compound before adding the catalyst to the reactor. Embodiments of the catalyst are prepared using components and reaction schemes which eliminate hazardous by-products. Accordingly, embodiments of the instant disclosure allow for increased activity, stereo-selectivity, Mw/PDI, and/or the like to be better controlled and reproduced. In embodiments of the instant disclosure, the carbene containing catalysts can be synthesized through more economical and environmentally friendly routes involving formation of catalyst precursors through reactions involving various aluminum alkyls, referred to herein as aluminum centered intermediates and/or aluminum compounds according to pathways disclosed herein. These pathways often involve clean one-pot reactions.

In embodiments of the process, supported catalysts are employed. In some embodiments, self-supported catalysts are employed. In other embodiments, the Ziegler-Natta catalysts are supported on metal oxides such as silica, titania, alumina, or various combinations thereof, so long as the support comprises surface OH groups. The use of supported heterogeneous catalysts allows for continuous processes where products are pushed out of the support by the monomer flow, with or without an optional solvent, allowing for subsequent isolation of the product without requiring the alcohol precipitation isolation step known in the art to remove the products from the homogeneous catalyst. Accordingly, embodiments of the instant disclosure render the quench step unnecessary while the product contaminated with catalyst residue is greatly limited or eliminated. Embodiments according to the instant disclosure achieve product isolation through precipitation which requires significant less alcoholic solvent than known processes, and which further allow for facile recycle of both monomer, any solvent, regenerated catalyst, and/or additional catalyst activator back into the process.

In embodiments, the catalysts may be prepared using synthetic pathways which prevent formation of harmful byproducts, including those known to cause reaction poisoning, equipment erosion, environmental hazards, and the like. In embodiments of the invention, these byproducts are eliminated during the formation of the catalyst by converting the hydroxyl group to alkali salt, e.g., sodium or potassium salt according to the following process:

$$ROH + NaH \rightarrow RONa + H_2 \qquad \text{i)}$$

$$4\ RONa + WCl_6 \rightarrow {}^*WCl_2(OR)_4 + 4NaCl \qquad \text{ii)}$$

$$WCl_2(OR)_4 + m\ AlR'_nX_{3-n} \rightarrow {}^*W(OAr)4=CHR''+ R'H + \tfrac{2}{3}AlCl_3 + (m-\tfrac{2}{3})AlR'_nX_{3-n} \qquad \text{iii)}$$

where n=1, 2, 3;
m×n is greater than or equal to 2
Ar is a substituted phenols, e.g., 4-MePhOH, 2-iPrPhOH, and the like;
X is a halide, preferably I, Br, or Cl;
the alkoxide —OR is a $C_3$-$C_{20}$ hydrocarbyl, typically a hydrocarbon including aliphatic
and aromatic groups;
R''=H or alkane, and R' is H forming the corresponding alkane.

In embodiments, an improvement is obtained using an aluminum alkyl to react with the alcoholic compound, which is then reacted with the metal chloride to directly form the carbene containing compound in-situ. In other embodiments, the catalyst is pre-formed in one-pot reaction without the generation of any harmful gas according to the general process: $2\ ROH + AlR'_3 \rightarrow 2\ Al(OR)_2R' + 2\ HR'$ (having a non-harmful alkane as the byproduct); followed by:

$$2\ Al(OR)_2R' + WCl_6 \rightarrow W(OR)_4=CHR''+R'H+2\ AlCl_3$$

In embodiments in which the catalytically active carbene W=CHR is unstable, the more stable precursor $W(OR)_4X_2$ can be made in large quantity for storage and used later with an activator aluminum alkyl, e.g., $AliBu_3$ according to the process:

$$2\ ROH + AlR'_2X \rightarrow 2\ Al(OR)_2X + 2\ HR' \text{(non-harmful alkane)} \qquad \text{I)}$$

$$2\ Al(OR)_2X + WX_6 \rightarrow W(OR)_{4X}X_2 + 2\ AlX_3 \qquad \text{II)}$$

$$W(OR)_4X_2 + Ali\text{-}Bu_3 \rightarrow {}^*W(OR)_4=CHR''+AliBuX_2 \qquad \text{III)}$$

wherein X is halogen, preferably chlorine. In embodiments, the product of step II may be formed and stored and then activated according to step III as needed. Examples of such embodiments include:

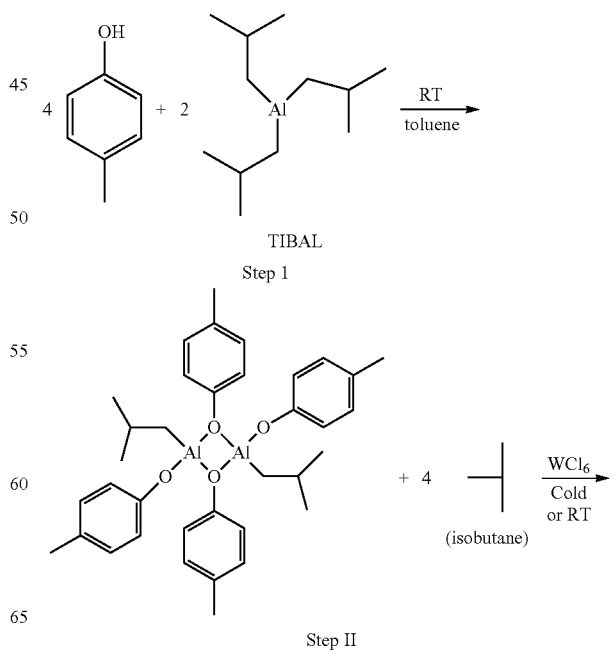

Step 1

Step II

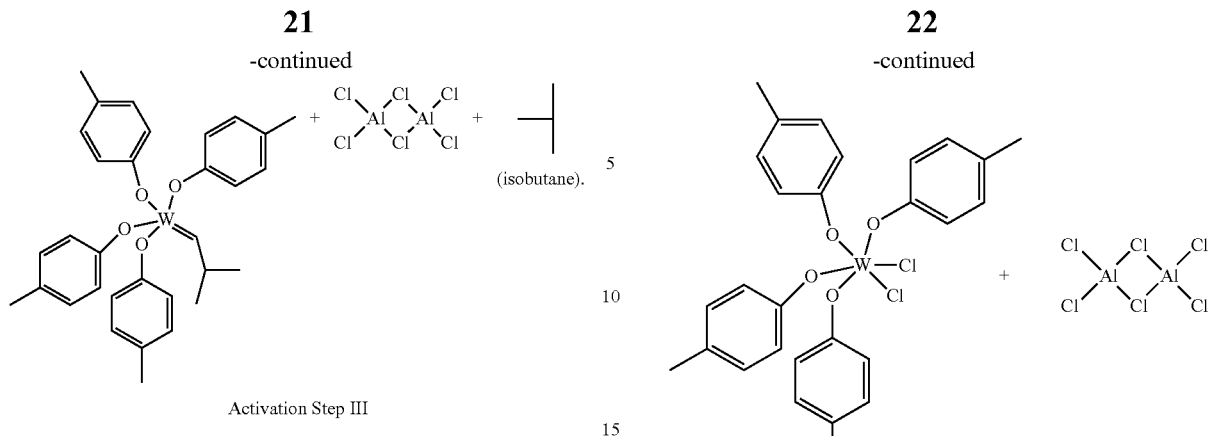

Activation Step III

Another example according to an embodiment of the invention utilizes a process in which a dichloro tungsten tetrakis alkoxide is first formed, following by activation with the aluminum alkyl at low temperature according to the following reaction scheme:

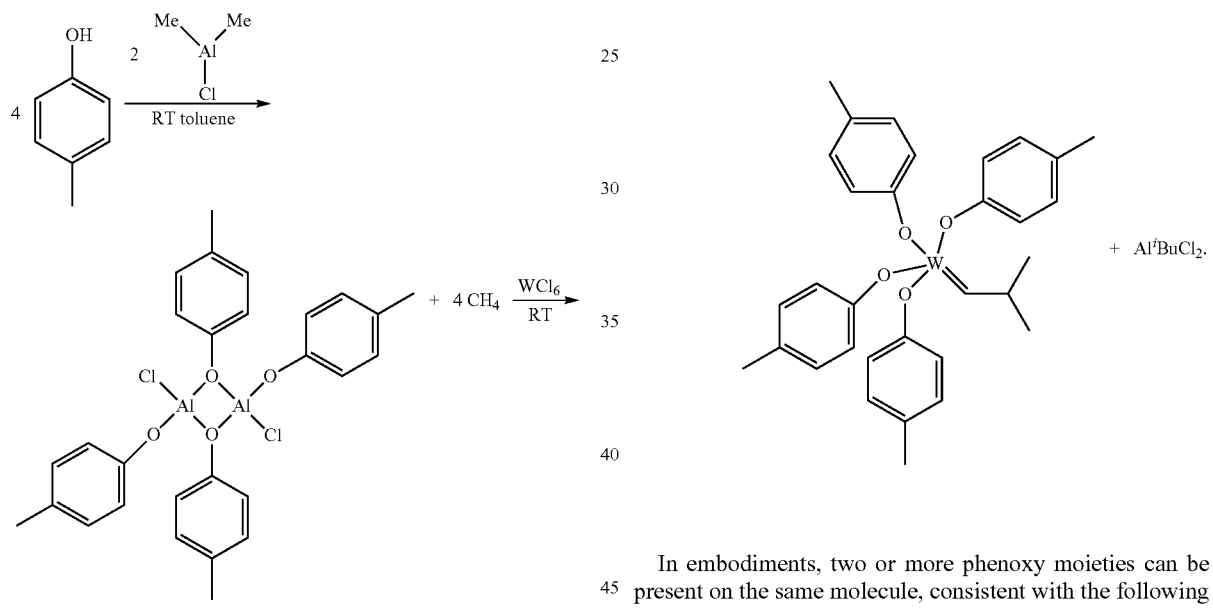

In embodiments, two or more phenoxy moieties can be present on the same molecule, consistent with the following reaction pathway:

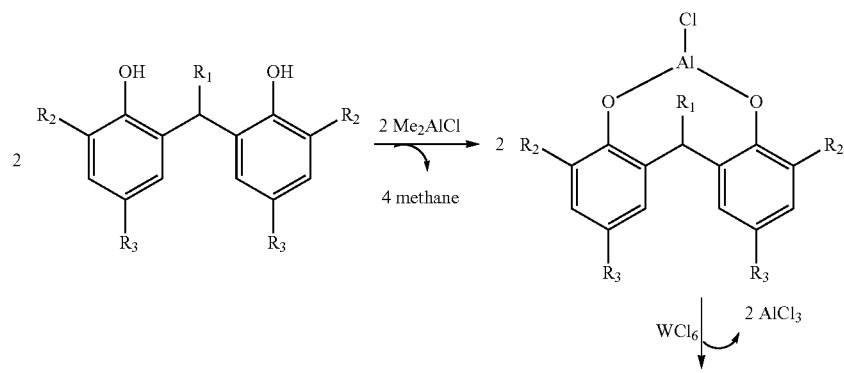

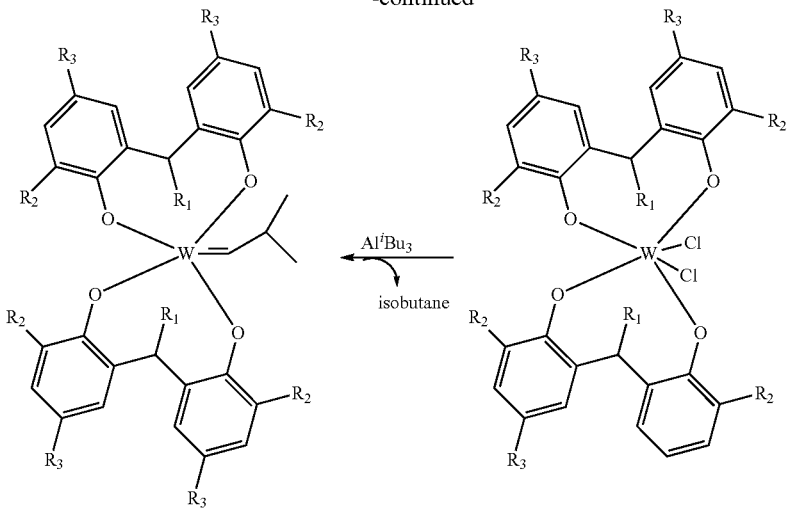

(e.g., $R_1$ = H, $R_2$ = $^tBu$, $R_3$ = Me)

where a chelating ligand intermediate is formed followed by the dichloro metal compound prior to activation.

In related embodiments, the active catalyst may preferably be formed directly according to the reaction pathway shown in the following example:

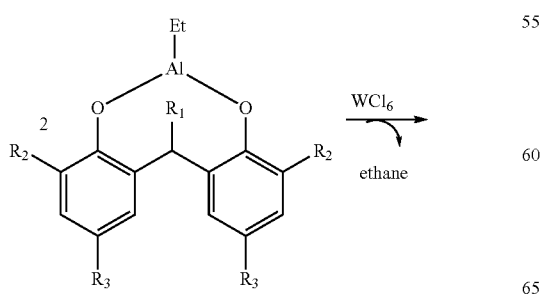

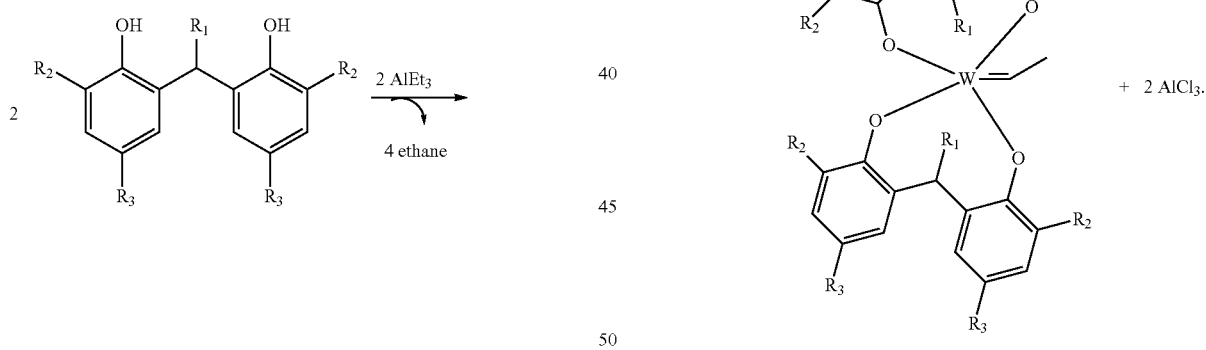

In other embodiments, mixed ligands such as a combination of chelating ligands and substituted phenols, may preferably be employed to form the catalyst according to the reaction pathway shown in the following example:

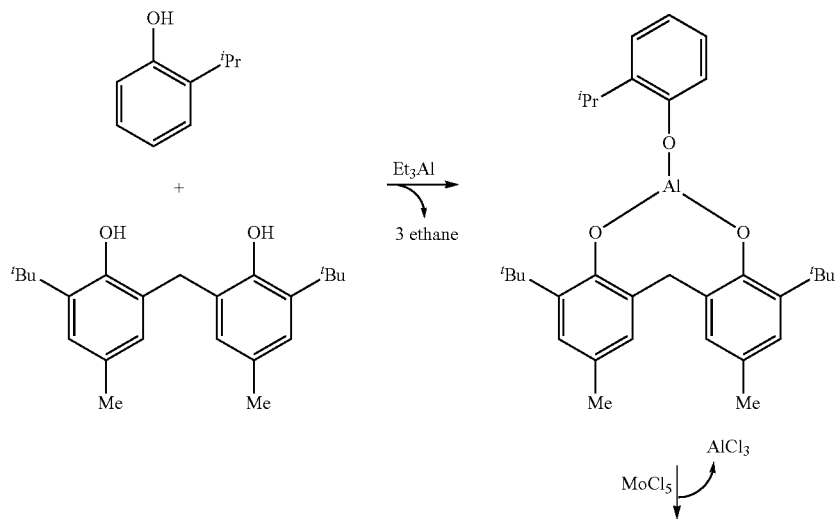

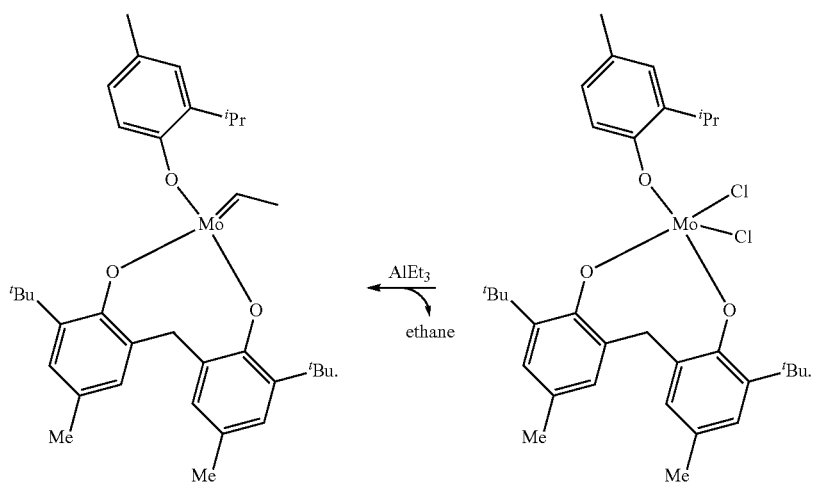

In such embodiments, suitable chelating ligands preferably include 2,2'-biphenol, substituted 2,2'-biphenols, and the like.

In any embodiment of the invention, supported catalysts may be self-supported wherein the ligands of the transition metal render the catalyst insoluble in the reaction medium. In embodiments, the multivalent ligands can be divalent linking moieties, trivalent linking moieties, or higher. The linking moieties serve as linear or framework structures to construct self-supported version with two dimensional linear structures, three dimensional tertiary structures, or both. The self-supported catalysts are terminated with mono-valent ligands, which may be utilized during formation of the catalysts to control the particle size and/or pore size of the self-supported catalyst.

In embodiments, the linking moieties may be based on bisphenol A, 4,4'-biphenol, and the like as divalent linear linker moieties according to the following example:

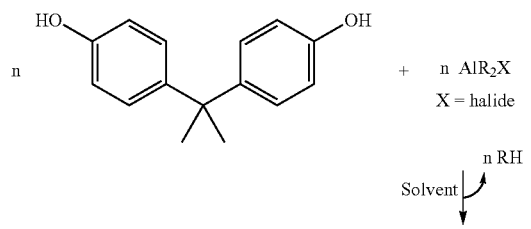

-continued
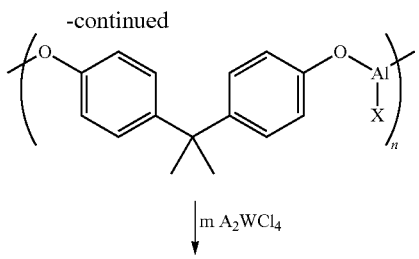
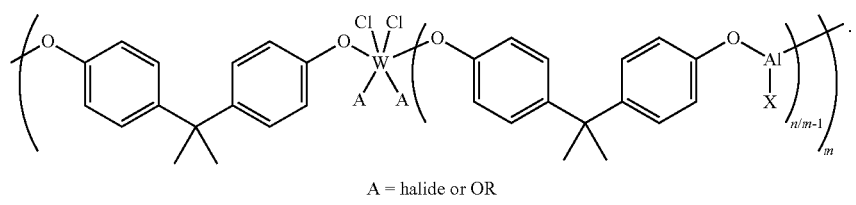
A = halide or OR
In embodiments, the tertiary structure of the self-supported catalyst may be formed using trivalent or other multivalent linking molecules as shown by the following example:
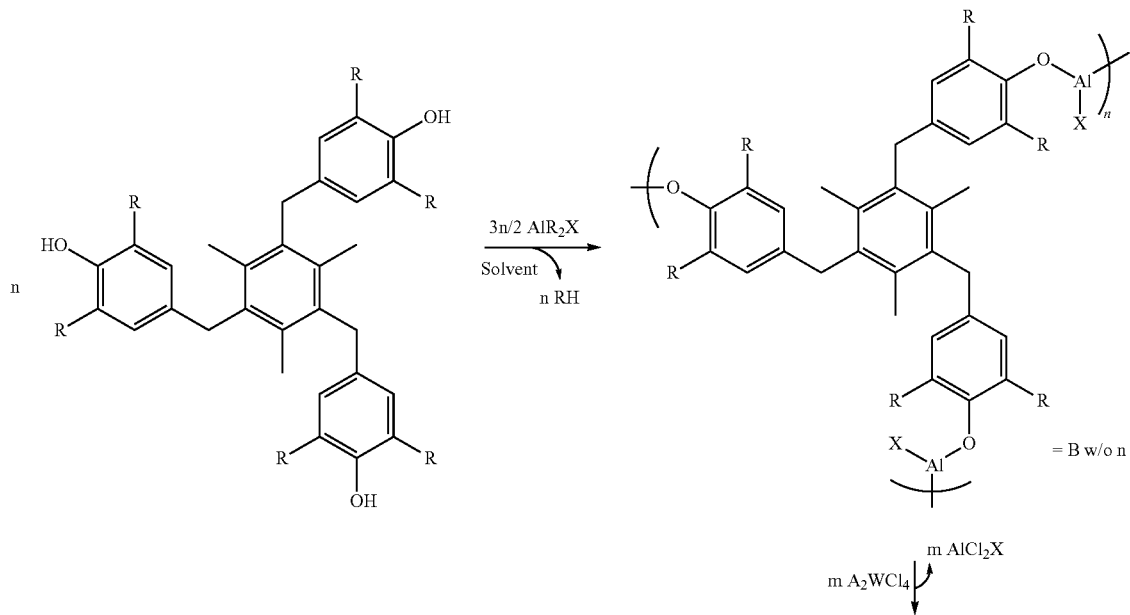

-continued

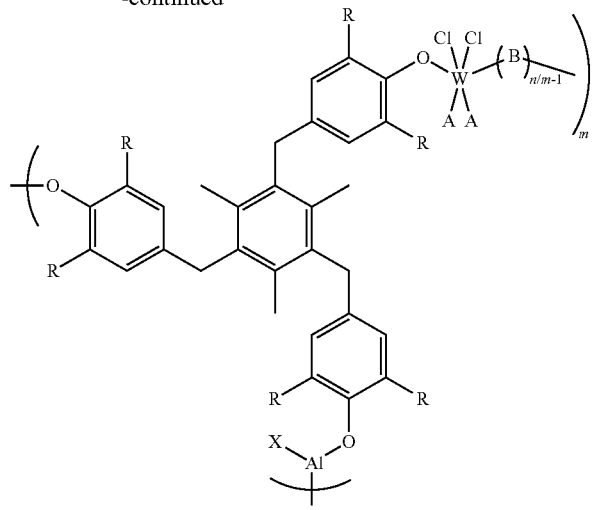

In embodiments the multivalent linking monomers and the monovalent monomers may be contacted under reaction conditions to produce the aluminum centered polymeric support as follows:

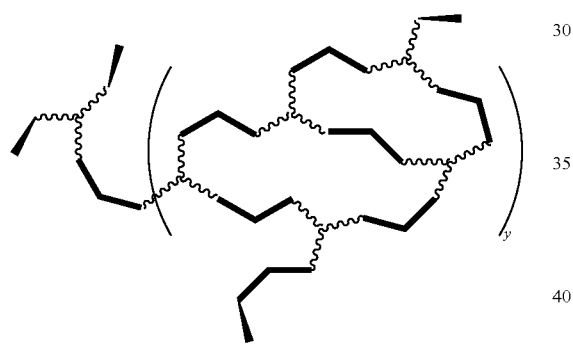

wherein the trivalent linking moieties are represented as

;

the divalent linking moieties are represented as ▬ ; and the monovalent chain termination moieties are represented as ╲.

In one particular embodiment, the aluminum centered catalyst precursor may include monovalent moieties, divalent moieties, and trivalent moieties according to the following:

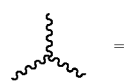 =

-continued

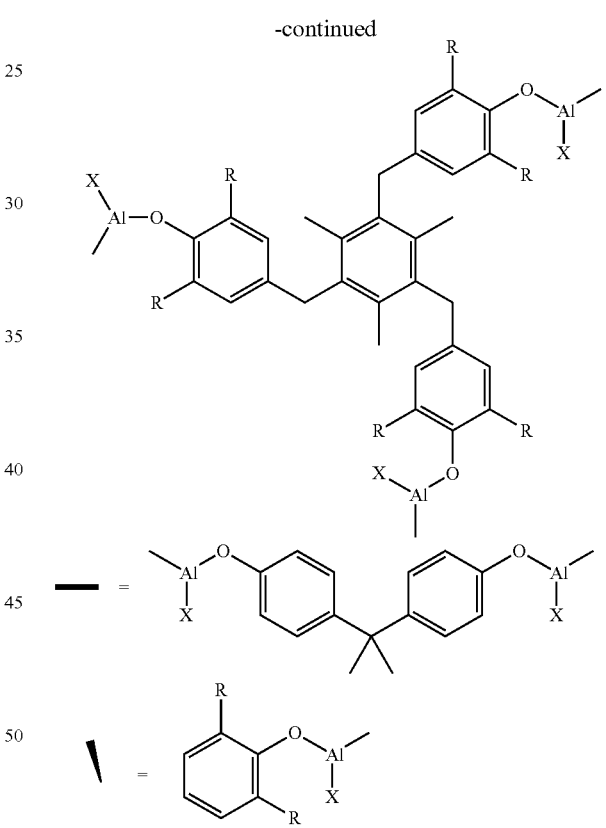

wherein X is halogen and R is $C_1$-$C_8$ hydrocarbyl.

In embodiments, the divalent and trivalent ligand ratio may be selected to control the pore size, and/or the relative ratios of monovalent, divalent and trivalent ligands may be selected to control the particle size of the self-supported catalyst.

In alternative embodiments. The monovalent chain termination moieties may be provided by reacting the divalent and trivalent moieties in an excess of $AlR_2X$ and/or $AlRX_2$ wherein X is halogen and R is $C_1$-$C_8$ alkyl such that the chains are terminated using the alkyl aluminum moiety, which may be used to control the cluster like molecule size (particle size) as shown in the following exemplary structure:

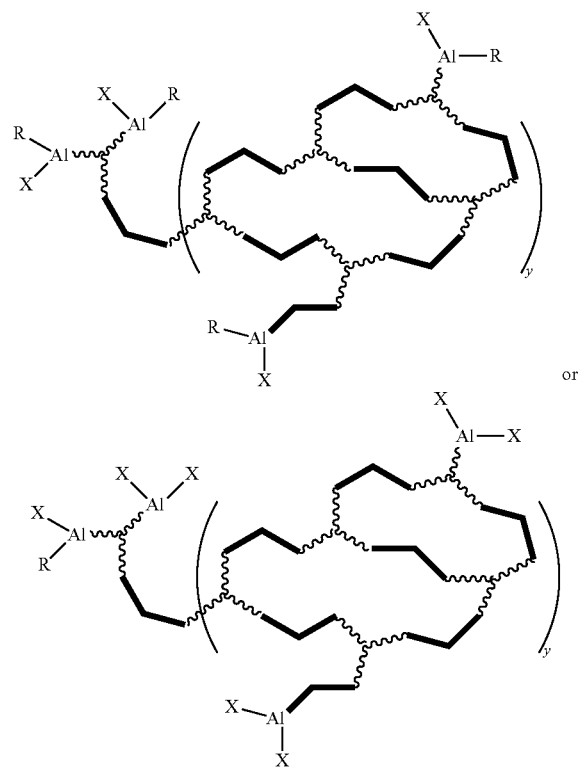

or

As is known in the art, the intermediate aluminum compounds of Ziegler-Natta compounds containing mixed ligands may exist as multiple species, e.g., $AlAB_2$ formed in a non-polar solvent can show a distribution of $AlA_2B$ (minor), $AlAB_2$ (major), and $AlB_3$ in a polar solvent, due to the fast ligand exchanging between two neighbor Al atoms. For example, $(4\text{-MePhO})_2AlCl$ is difficult to crystallize in non-polar solvent such as toluene because multiple species exist in an equilibrium:

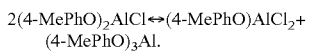

This phenomena renders $(4\text{-MePhO})_3Al$ difficult to crystallize. However, it has been discovered that crystallization of such aluminum intermediates may be accomplished by addition of a donor group, typically an ether and/or at tertiary amine. For example, using THF as a donor compound, $(4\text{-MePhO})_3Al$ may be readily crystallized as a dimeric five coordinated Al species with one THF for each Al according to the following formula:

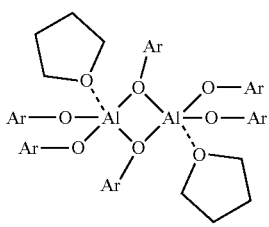

wherein Ar is 4-Mephenyl.

Applicant has discovered that such THF and other adduct form highly active catalysts when used to construct the active catalyst with $WCl_6$. Although many W compounds can polymerize THF to block or destroy the carbene formation, the molecular level THF present may only alter the metathesis polymerization behavior and yield different polymer structures (different Mw, trans:cis ratio, etc.) with the same ligand structure except with or without the coordinated THF. Other donor can be used as the donor, e.g., $Et_2O$, $MeO^tBu$, $NMe_3$.

In embodiments of the invention, polymerization processes conditions and reactants may be selected to control the Mw and/or the trans:cis ratio of the polymers produced. In embodiments, the supported catalyst according to one or more embodiments is employed in a reactor comprising a filtration element that retains the supported catalyst but which allows the solution of product polymer, e.g., polyalkenamer such as polypentenamer, to pass through such that the polymer is effectively separated from the supported catalyst as part of a continuous process.

In embodiments, the temperature of the process is selected within a range from about −35 to 100° C., depending on the monomers used and the desired properties of the polymer. In other embodiments, the monomer is separated from the polymer and then recycled, e.g., to the polymerization reactor. Applicant has discovered that by controlling the amount of monomer recycle, the deep color of the final product caused by retention of the catalyst in the product can be avoided, along with the massive amounts of solvent typically required for residue removal. In embodiments, the monomer is used as the reaction solvent thus eliminating the quenching step due to the separation of product from the catalyst.

In embodiments, the invention may further include selecting the temperature at which the active catalyst species is formed. In embodiments, the active catalyst is formed at a temperature of less than 5° C., preferably less than 0° C., preferably less than −5° C., preferably less than −10° C., preferably less than −20° C., preferably less than or equal to −35° C. Applicant has discovered that by forming the catalyst at such low temperatures, followed by increasing the temperature of the polymerization reaction to a temperature of about 100° C. or less, preferably from about 0 to 40° C. The Group 5 or Group 6 transition metals used to form the active catalyst species, i.e., the carbene species, for cyclic olefin polymerization have been discovered to be more stable at these lower temperature compared to room temperature or higher. Applicant discovered that when the process includes forming the catalyst prior to contacting the monomer, the preferred formation temperature is less than or equal to about 0° C., more preferably less than about −20° C. or less than −35° C. If the active catalyst is generated in-situ, applicant has discovered a corresponding benefit by selecting a polymerization reaction temperature which is lower at the beginning, e.g., −5 to −35° C., for a period of time sufficient to form the active catalyst, followed by increasing the temperature, e.g., 0 to 40° C., for a batch polymerization process. In continuous embodiments, the reaction temperature may be set below about 5° C. to obtain a similar benefit.

In embodiments, the Mw and other properties of the polymer e.g., formation of functionalized end groups, multimodal Mw control, and the like, by incorporation of one or more comonomers into the process.

In embodiments, a linear olefin, e.g., 1-hexene, may be included in the cyclic olefin monomer to reduce the polymer molecular weight. Applicant has discovered that increasing the ratio of linear olefin to cyclic olefin results in a lower molecular weight product.

In embodiments, the straight olefin can bear functional groups such as siloxane, amine groups, and the like. Suitable examples include $CH_2\!=\!CH\!-\!(CH_2)_n\!-\!OSiMe_3$ (n=1-20); $CH_2\!=\!CH\!-\!(CH_2)_n\!-\!NMe_2$ (n=1-20), or combinations thereof. In other embodiments, multi-modal Mw polymers may be produced by selecting the ligands used to form the catalyst according to the present invention. Accordingly, in embodiments the polycycloolefins produced according to the instant disclosure may further comprise chain-end functionality. In embodiments, the olefin chain termination agent $CH_2\!=\!CH\!-\!R$ comprises an R group comprising one or more functional groups. Accordingly, in embodiments the polymer chains with the functionalized termination groups will have functionality at the chain ends. Both the concentration of the functionalized termination groups, and the selection of the functional groups allow for control over the physical properties of the resulting polymers. Applicant has further discovered that control may be achieved by selecting the relative bulkiness of the ligand used to form multiple ligand environments with the same metal centers or by employing ligands having the same relative size (i.e., ligand bulkiness) with different metal centers, or a combination thereof.

In embodiments, the cis:trans ratio of the polymer has been discovered to result in different physical properties. This phenomenon is thought to be due to the faster crystallization of trans conformation relative to the amorphous cis conformation. In embodiments, the cis:trans ratios of the polymers can be controlled by selecting the ligands used to form the catalysts, the metal used to form the catalysts, or a combination thereof.

In embodiments, the invention may further include copolymerization systems, wherein one or more different cyclic olefins serve as the comonomer to form the product copolymers. Examples include the establishment of routes to long chain branching by the incorporation of side chain unsaturation, e.g., through vinyl norbornene, ethylidene norbornene, and/or the like in the backbone of the polymer. In embodiments, the comonomers may then act as initiation points for ROMP or cross metathesis reactions. In alternative embodiments, DCPD may be used as a comonomer to form polymers in which both rings of the monomer have been opened to produce a four armed star.

In alternative embodiments, properties of the product polymers may be controlled by employing polymerization systems comprising two or more reactors connected in a sequence. Embodiments may further include producing heterophasic copolymers.

EXAMPLES

The present disclosure can be further illustrated by the following non-limiting examples.

Catalyst formation comprises reacting a catalyst precursor with an activator to form an active catalyst, also referred to herein as comprising a carbene functional group. The catalyst precursor comprises a Group 5 or Group 6 metal, preferably tungsten, tantalum, niobium, and/or molybdenum. The activator is an alkyl aluminum and/or an alkyl aluminum halide compound.

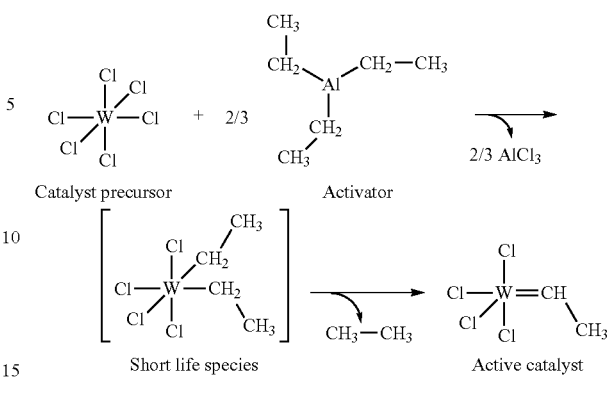

For purposes herein, $WCl_6$ and $MoCl_5$ are used as the catalyst precursor, or in forming the catalyst precursor, also referred to as a transition metal compound. Other compounds which could be used include $TaCl_5$ and/or $NbCl_5$. The activator comprises moieties having the general formula $AlR_mZ^*_{(3-m)}$, where each $Z^*$ is H, $C_1$-$C_7$ alkyl, alkoxy, or halogen. Examples include $AlMe_3$, $AlMe_2Cl$, $AlMeCl_2$, $AlEt_2Cl$, $AlEtCl_2$, $AlEt_2(OR)$, $AlEt(OR)_2$, and the like, wherein OR is an alkoxy radical and R can be any $C_1$ to $C_{20}$, preferably $C_1$ to $C_{10}$ aliphatic or aromatic radical with or without substituents.

Polymerization reactions include cyclo-olefin ring opening metathesis polymerization (ROMP) consistent with the following reaction, wherein the active catalyst is according to any embodiment or combination of embodiments disclosed herein:

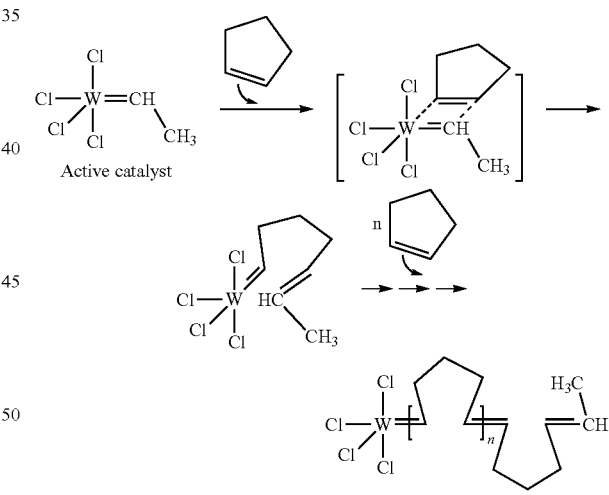

In the examples, the cyclic olefin monomers include cyclopentene, denoted as "cC5=", however, other 6 to 10 membered ring containing cyclo-olefins, e.g., cyclohexene, cyclooctene, cyclodecene, and the like may be used.

In the following examples, $WCl_6$ and $MoCl_5$, aromatic alcoholic compounds (2-isopropylphenol, 2,6-diisopropylphenol, 4-methylphenol), tertiary butyl hypochloride, aluminum alkyls (e.g., triethylaluminum ($AlEt_3$ or TEAL), triisobutylaluminum ($Al^iBu_3$ or TIBAL), diethylaluminum chloride ($Et_2AlCl$ or DEAC), Ethylaluminum dichloride ($EtAlCl_2$ or EADC)), NaH, cyclopentene, 1-hexene, and solvents (benzene, toluene, isohexane, ethanol), and antioxidant Irgonox 1076 were purchased from Sigma-Aldrich and used without further purification unless explicitly stated otherwise. Silica ES70X was obtained from PQ Corporation (Malvern, Pa., USA) and was calcined at about 200° C. for 3-4 hours to form the "low-temperature" silica support, or at about 600° C. for 3-4 hours to form the "high temperature" silica support, prior to use. All solvents were anhydrous grade and were further treated with activated 3 Å molecular sieves by storing the solvent in a container with 5-10 wt % molecular sieves for at least 24 hours prior to use.

Cyclopentene was treated with 3 Å molecular sieves the same way and was passed through an activated basic alumina column before use. All deuterated solvents (CDCl$_3$, C$_6$D6, CD$_2$Cl$_2$, d8-THF, and the like) were obtained from Cambridge Isotopes (Cambridge, Mass.) and dried over 3 Å molecular sieves before use. Other chemicals such as the aromatic alcohols, aluminum alkyls were used as received. All reactions were performed under an anhydrous inert nitrogen atmosphere using standard laboratory techniques unless otherwise stated.

A gel permeation chromatography method, Tosoh Eco-SEC High Temperature GPC system (GPC-Tosoh EcoSEC), was used to determine the polypentenamer Mw, Mn and Mw/Mn using the high temperature gel permeation chromatography instrument (Tosoh Bioscience LLC), equipped with a differential refractive index detector (DRI). Three high temperature TSK gel column (Tosoh GMHHR-H(20) HT2) were used. The nominal flow rate was 1.0 mL/min, and the nominal injection volume was 300 μL. The various transfer lines, columns, and dual flow differential refractometer (the DRI detector) were contained in an oven maintained at 160° C. Solvent for the experiment is prepared by dissolving 1.2 grams of butylated hydroxytoluene as an antioxidant in 4 liters of Aldrich reagent grade 1,2,4 trichlorobenzene (TCB). The TCB mixture was then filtered through a 0.1 μm teflon filter. The TCB was then degassed with an online degasser before entering the GPC instrument.

Polymer solutions were prepared by placing dry polymer with about 10-15 wt % anti-oxidants of Irganox 1076 and Irgafos 168 in glass vials, adding the desired amount of TCB, then heating the mixture at 160° C. with continuous shaking for about 2 hours. All quantities were measured gravimetrically. The injection concentration was from 0.5 to 1.0 mg/mL, with lower concentrations being used for higher molecular weight samples. Flow rates in the apparatus was then increased to 1.0 mL/minute, and the DRI was allowed to stabilize for 2 hours before injecting the first sample. The molecular weight was determined relatively to polystyrene molecular weight standards in which the instrument was calibrated with a series of monodispersed polystyrene standards. All molecular weights are reported in g/mol unless otherwise noted.

A standard polycycloolefin sample, commercial neodymium butadiene rubber CB24 (ExxonMobil, Houston, Tex.) with known molecular weight Mw about 300 k was used to verify that the GPC method, and to confirm that the 160° C. temperature does NOT cause significant polymer cross-linking resulting in artificially high molecular weight determinations. The experimentally obtained result of a 339 k molecular weight for the commercial neodymium butadiene rubber CB24 indicates a non-significant cross-linking under the measurement conditions.

The polymer trans:cis ratio was measured with a standard $^{13}$C NMR instrument according to methods known in the art. Samples were prepared with 66.67 mg/ml of CDCl$_3$ (deuterated chloroform) in a 10 mm tube. The $^{13}$C NMR spectra were measured on a Bruker 600 MHz cryoprobe with inverse gated decoupling, 20 s delay, 90° pulse, and 512 transients.

Assignments were based on assignments from O. Dereli et al. (2006) *European Polymer Journal*, v. 42, pp. 368-374. Three different positions were used for calculation of the trans/cis composition:

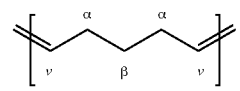

1. vinyl peaks with trans at 130.3 ppm and cis at 129.8 ppm;
2. alpha position trans/cis (tc) at 32.2 ppm, trans/trans (tt) at 32.07 ppm, cis/cis (cc) at 26.9 ppm and cis/trans (ct) at 26.74 ppm;
3. beta position cis/cis (cc) at 29.86 ppm, cis/trans (trans/cis) (ct+tc) at 29.7 ppm and trans/trans (tt) at 29.54 ppm;
4. Trans=tt+0.5*(ct+tc); and
5. Cis=cc+0.5*(ct+tc).

The calculation for each of groups 1-3 above (i.e., vinyl, alpha, and beta) were averaged to get an average trans and cis composition. An exemplary $^{13}$C NMR spectra is shown in FIG. 1.

As indicated, some small scale polymerization conversion rates were monitored and estimated with $^1$H NMR method using a Bruker 400 MHz instrument. Pulse program zgcw30 was used with D1=60 s and ns=2 or 4. CDCl$_3$ was the lock solvent. The chemical shift of cyclopentene monomer double bond protons was measured to be about 5.75 ppm and the chemical shift of polypentenamer double bond protons was experimentally determined to be about 5.53 ppm. Integral from 5.45 to 6.00 ppm ($I_{m+p}$) was used to cover the two chemical shifts, which was then set to 100% to represent total cyclopentene. The integral from 4.55 to 5.60 ppm ($I_{p+RS}$) is the polypentenamer overlapped with the right $^{13}$C satellite chemical shift of cyclopentene. To substrate the $^{13}$C satellite contribution from the overlapped integral, the similar intensity left $^{13}$C satellite of cyclopentene was integrated from 5.93 to 5.97 ppm ($I_{LS}$) and the conversion C calculated as follows:

$$C=(I_{P+RS}-I_{LS})/I_{m+p}$$

Appropriate $^{13}$C decoupling programs produced an $I_{LS}$ equal to zero.

Polymerization of Cyclopentene with RO—X (X=H or Cl)+WCl6 (or MoCl5)+Al—R containing activator.

Comparative Examples 1-1 to 1-5 and 1-7

Comparative example Cex1-1 and examples 1-2 is based on procedures known in the art, scaled to a 4 L jacketed filter reactor (Ace Glass Inc.) with a Lauda chiller capable of cooling to −35° C.

Examples 1-1 through 1-7 were prepared according to the following general procedure: in the 4 L Jacketed reactor, cyclopentene (cC5=) and optional solvent (toluene/benzene/hexane) was added. The reactor was then cooled to the desired temperature as noted. In a round bottom flask, transition metal basic catalyst WCl$_6$ or MoCl$_5$ and a solvent were added and mixed well with a magnet stirrer. Another round bottom flask was charged with the alkoxide precursor compound RO—X and a solvent. The RO—X solution was then slowly added to the solution $WCl_6$ or $MoCl_5$. The mixture was stirred for 1 hour. When required, $N_2$ was blown on top of the reaction mixture to remove harmful gas such as HCl or $Cl_2$ formed during the reaction process. Then prepared catalyst precursor was added to the cyclopentene solution in the 4 L jacketed filter reactor. The activator-aluminum-alkyl compound $AlR_mZ_{(3-m)}$ was added to induce the polymerization and the reactor mixture was stirred and the temperature maintained for the desired reaction time.

A third flask was charged with Irgonox 1076 (BBHT), ethanol, solvent and $NaHCO_3$. This reaction mixture was added to the stirring reactor to stop polymerization. The quenched reaction was then stirred for an additional 60 minutes.

The quenched reaction mixture (the polymer solution) was then added to 10 to 12 L of ethanol in a 5 gallon bucket and stirred to precipitate the resultant polymer from the reaction mixture and the polymer removed by filtration. Irgonox solution in toluene was then added on top of the polymer, and the resulting slurry was dried under vacuum in a vacuum oven at 50° C. for 24 hours. The catalyst preparation, polymerization conditions, and polymerization quench procedures for Examples 1 through 6 are summarized in Table 1. Yield, conversion, Mw, trans:cis ratio data are shown in Table 4.

Example 1-6

In example 1-6, the procedure further included addition of a straight chain alpha olefin in the reaction mixture to control molecular weight of the polymer. 0.5 g of 1-hexene ($C_6=$) was added to form a ($cC5=$):($C_6=$) wt/wt ratio of 2000:1. As the example confirms, the chain length of the resulting polymer, i.e., the Mw, may be controlled by including an amount of an olefin chain termination agent $CH_2=CH-R$, preferably a normal or straight-olefin chain termination agent, where R is a $C_1$ to $C_{20}$ hydrocarbon radical, preferably a straight-chain hydrocarbon radical.

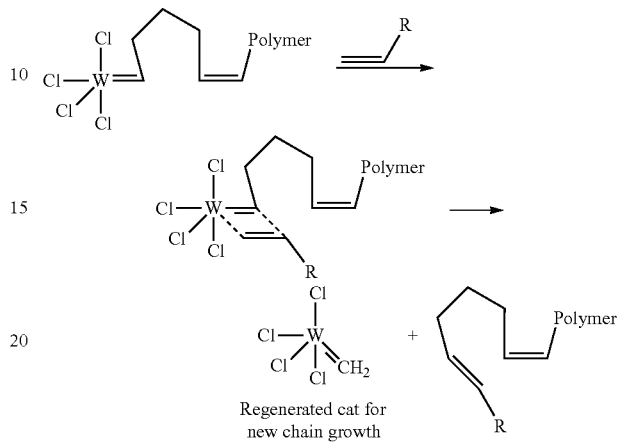

Regenerated cat for new chain growth

The ratio of straight chain olefin $CH_2=CH-R$ (e.g., 1-hexene) to cC5 determines the chain length and therefore the molecular weight of the polycycloolefins produced according to embodiments disclosed herein.

Example 1-6 suggests that inclusion in the reaction mixture of an alpha olefin bearing a functional group, e.g., a siloxy or amine group, can introduce the functionality to the polymer chain ends.

TABLE 1

Experiment Summary for Examples 1-1 to 1-7

| | Monomer/conditions | | | Catalyst | | | | | RXN | Quench | | |
|---|---|---|---|---|---|---|---|---|---|---|---|---|
| | | | | | $WCl_6$ | | | Activator | Time | BBHT | EtOH | Solvent |
| | cC5 = | Solvent | | T | ($MoCl_5*$) | RO—X | | $AlR_mX_{(3-m)}$ | | | | |
| Run ID | g | Name | G | °C. | g | Formula | g | Name | g | min | g | ml | ml |
| CEx 1-1 | 1150 | Benzene | 1600 | RT | 3.0 | $^tBuOCl$ | 0.82 | $AliBu_3$ | 2.63 | 240 | 3 | 25 | Bezene 400 |
| CEx 1-2 | 960 | Benzene | 3000 | 0 | 3.0 | $^tBuOCl$ | 0.82 | $AliBu_3$ | 2.62 | 180 | 5 | 25 | Benzene 400 |
| CEx 1-3 | 848 | Benzene | 3200 | 30 | 1.0 | $^tBuOCl$ | 0.27 | $AliBu_3$ | 1 | 300 | 5 | 25 | Benzene 400 |
| CEx 1-4 | 1080 | Hexane | 2060 | 0 | 1.4 | $Cl_5C_6OH$ | 1.82 | $AliBu_3$ | 0.43 | 240 | 3 | 15 | Hexane 250 |
| CEx 1-5 | 1434 | Toluene | 2000 | 5 | 3.2 | 2-iPrPhOH | 6.15 | $AlEt_3$ | 2.51 | 90 | 3 | 45 | Toluene 250 |
| Ex 1-6 | 1000 + 0.5 hexene | Toluene | 1000 | 5 | 1.16 | 2,6-Me2PhOH | 1.44 | $AlEtCl_2$ | 15.08 | 150 | 3 | 45 | Toluene 250 |
| CEx 1-7 | 470 | Non | — | -25 | 9.0* | Non | — | $AlEt_3$ | 8.59 | 180 | 3 | 20 | Hexane 250 |

*0.5 g of 1-hexene (C6=) was added, cC5=:C6= wt/wt ratio of 2000:1.

Improved Catalyst Formation and Polymerization

The following examples were generated using synthetic pathways which eliminate the generation of harmful gas, improve activities, and provide different trans:cis ratio and molecular weight controls according to embodiments disclosed herein.

Polymerization of cyclopentene with $(RO)_2AlCl+WCl_6+$ activator (Al—R containing compound).

Example 2-1-1 (RO=2-iPrPhO, Polymerization at 0° C.)

$(2-iPrPhO)_2AlCl$ Preparation—$(2-iPrPhO)_2AlCl$ was prepared from the reaction of $R_2AlCl$, e.g., $Me_2AlCl$ or $Et_2AlCl$ (Aldrich product), with 2-iPrPhOH in hydrocarbon solvent (toluene and/or isohexane) by slow addition of 2 eq of neat or dilute 2-iPrPhOH to the aluminum alkyl solution at ambient temperature (i.e., 25° C.). The resultant solution was then used and/or the resultant oil obtained after solvent removal.

Catalyst Preparation—Neat $(2-iPrPhO)_2AlCl$ (504 mg, 1.518 mmol) was added to a solution of $WCl_6$ (300 mg, 0.757 mmol) in toluene (10 mL). The resulting mixture was stirred for 2.5 hours at room temperature.

Polymerization—The solution of cC5= (100 g, 130 mL, purified by passing through alumina column) in toluene (300 mL) was added to a 2-necked round bottom Schlenk flask (2 L) containing a mechanical stirrer. Neat triethylaluminum ($Et_3Al$, 173 mg, 1.517 mmol) was then added. Vigorous agitation was applied and the resulting solution was cooled down to 0° C. The solution of premade catalyst (A) was then injected into the reaction mixture. The reaction mixture became viscous after about 40 minutes of reaction time. After 3 hours at 0° C. (conversion: 64%), the solution of BHT (338 mg, 1.513 mmol) in EtOH (50 mL)/toluene (100 mL) was added to quench the catalyst and the unreacted aluminum alkyls. The resulting mixture was subsequently slowly poured into EtOH (1 L) under intense mechanical mixing. The formed polymer was then washed with EtOH (3×500 mL) and dried in vacuo at 50° C. for 4 hours. Dried solid product was stored under nitrogen atmosphere. Alternatively, the solution of antioxidant (BHT) in ethanol was sprayed above the polymer surface to prevent cross-linking upon exposure to air. Isolated yield: 58.3 g, Cis/Trans ratio: 15/85%, Mw: 493 k; Mw/Mn: 2.00.

Example 2-1-2 (RO=2-iPrPhO, Polymerization at 0° C.)

$(2-iPrPhO)_2AlCl$ Preparation—$(2-iPrPhO)_2AlCl$ was prepared as described above.

Catalyst Preparation—the neat-oil $(2-iPrPhO)_2AlCl$ 1.007 g was added to the solution of $WCl_6$ 600 mg in 20 ml toluene and stirred for 1 hour at room temperature.

Polymerization—a solution of cC5= (270 mL) in toluene (700 mL) was prepared to which was added neat $AlEt_3$, which was then cooled to 0° C.; and then added the catalyst mixture to the cC5= solution under vigorous stirring; the mixture became viscous after about 40 minutes reaction time. After 3 hours at 0° C., the solution of BHT in EtOH (50 mL)/toluene (150 mL) was added to the reaction mixture. The resulting mixture was added to EtOH (1 L) under intense mechanical mixing. The formed polymer was washed with EtOH (3×0.5 L) and dried in vacuo at 50° C. for 4 hours; isolated yield: 160 g (77%); Cis/Trans ratio: 14/86; Mw: 218 k; Mw/Mn: 1.78.

The two examples above show that $(2-iPrPhO)_2AlCl$ as the ligand precursor for the modification of the basic catalyst $WCl_6$ displays markedly improved activities (conversion/hour) than comparative example AA2066 where 2-iPrPhOH is used as the ligand precursor. In addition, these examples confirm that different Mw and different trans:cis ratios may be produced.

Example 2-1-1 and 2-1-2 under the very close conditions that show significant different molecular weights are likely due to the scale difference where agitation for the larger scale was not as efficient as the smaller scale and the local heat was higher (especially when the conversion rate was higher). The examples further confirm substantial improvement of the catalyst may be obtained by selecting appropriate ligands according to electronic and/or steric modification of the catalyst active site. In embodiments, one of the halogens, e.g., a Cl atom on the catalyst precursor $WCl_6$ (or $MCl_5$, M=Mo, Ta, Nb) is replaced by an alkoxy group bearing different group(s) to effect a change in the ligand electronic and/or steric effects.

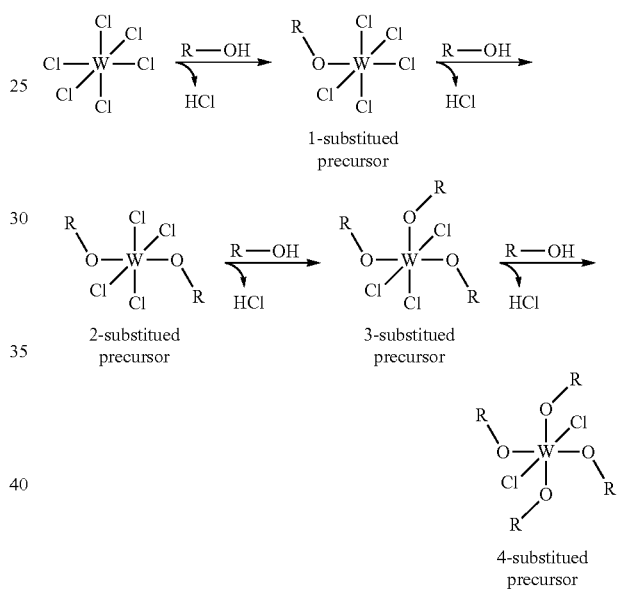

Such catalyst modifications result in improvement in catalyst activity, allow for control over the trans:cis ratio of the resulting polymer, and/or allow for control over the molecular weight of the polymer. However, it has been discovered that in embodiments, at least two halogen groups are retained on the transition metal compound to allow an activator (e.g., aluminum alkyl) to convert the two halo groups into the active carbene species. Accordingly, the maximum number of alkoxylated ligands on $WCl_6$ and other hexavalent transition metals is limited to 4, and for $MoCl_5$, $TaCl_5$, and $NbCl_5$ and other pentavalent transition metals the maximum number of alkoxylated ligands is limited to 3. The alkoxy groups (RO—) may comprises $C_1$ to $C_{20}$ hydrocarbon oxy group including aliphatic oxy or aromatic oxy group. In embodiments, the oxygen atom is directly connected to an aromatic ring.

Example 2-1-3 (RO=2-iPrPhO, Polymerization at 21-25° C.)

(2-iPrPhO)2AlCl preparation—(2-iPrPhO)2AlCl was prepared as described above.

Catalyst preparation—neat (2-iPrPhO)2AlCl (25 mg, 0.075 mmol) was added to the solution of $WCl_6$ (15 mg, 0.038 mmol) in toluene (2 mL). The resulting mixture was stirred for 1.5 hours at room temperature then cooled down to −35° C.

Polymerization—neat $Et_3Al$ (9 mg, 0.13 mmol) was added to the solution of cyclopentene (5 g, 73 mmol) in toluene (15 mL). The mixture was cooled down to 0° C. before the catalyst solution was added under intense stirring. The reaction temperature was allowed to rise up to 25° C.; the mixture became viscous after about 10 minutes reaction time. After stirring 3 hours at 25° C. (conversion: 91% by NMR), the solution of BHT (9 mg, 0.04 mmol) in EtOH (1 mL)/toluene (5 mL) was added. The resulting mixture was subsequently poured into EtOH (200 mL) under intense mechanical mixing. The precipitated polymer was washed with EtOH (2×200 mL) and dried in vacuo at 50° C. for 4 hours to give 3.81 g of a white polymer. The yield of this example is artificially low due to product precipitation and transfer issues. The following properties were determined: Mw: 193 k; Mw/Mn 1.99; Trans/cis 84/16.

This experiment shows that polymerization temperature has tremendous influence over the Mw, i.e., the higher the reaction temperature, the lower the molecular weight. However, the above example suggests that the trans:cis ratio is not significantly changed by the reaction temperature.

Example 2-2 (RO=4-MePhO, Polymerization at 0° C.)

(4-MePhO)$_2$AlCl preparation—4-MePhOH and the dimethylaluminum chloride in 2:1 molar ratio, e.g., 3.55 g (33 mol) and 1.52 g (16 mmol), were dissolved in separate vessels in toluene, e.g., 30 g in each vessel. The p-cresol solution was then slowly added to the stirring solution of $Me_2AlCl$. The solution stayed clear, but a vapor formed above the stirring reaction mixture. The reaction was allowed to stir overnight. The toluene was removed to give a viscous colorless residue. The residue was dissolved in pentane and the pentane was removed to give a fine white powder that contains 7 wt % toluene determined by NMR. (18-AD1410).

Catalyst preparation—the solid (4-MePhO)$_2$AlCl (1.17 g) was added to a solution of $WCl_6$ (0.75 g) in toluene (20 mL) and stirred for 1.0 hour at room temperature.

Polymerization—a solution of cC5= (336 mL) in toluene (900 mL) was prepared and neat AlEt3 (0.432 g) was added to the cC5= toluene solution. The solution was then cooled down to 0° C. and the catalyst solution was added under stirring; the mixture became viscous after about 10 minute reaction time. No stirring was possible after 40 minutes due to the high viscosity of the reaction mixture. After 3 hours at 0° C., the solution of BHT in EtOH (20 mL)/toluene (100 mL) was added to the viscous mixture. The resulting mixture was added to EtOH (1.5 L) under intense mechanical mixing. The formed polymer was washed with EtOH (3×500 mL) and dried in vacuo at 50° C. for 4 hours. Yield: 228 g (91%); cis:trans ratio: 17/83%; Mw: 315 k; Mw/Mn: 1.80.

Polymerization of cyclopentene with [(RO)$_3$Al(THF)]$_2$+ $WCl_6$+activator (Al—R containing compound).

Example 2-3-1 (RO=4-MePhO, Polymerization at 0° C.)

Figure 2:
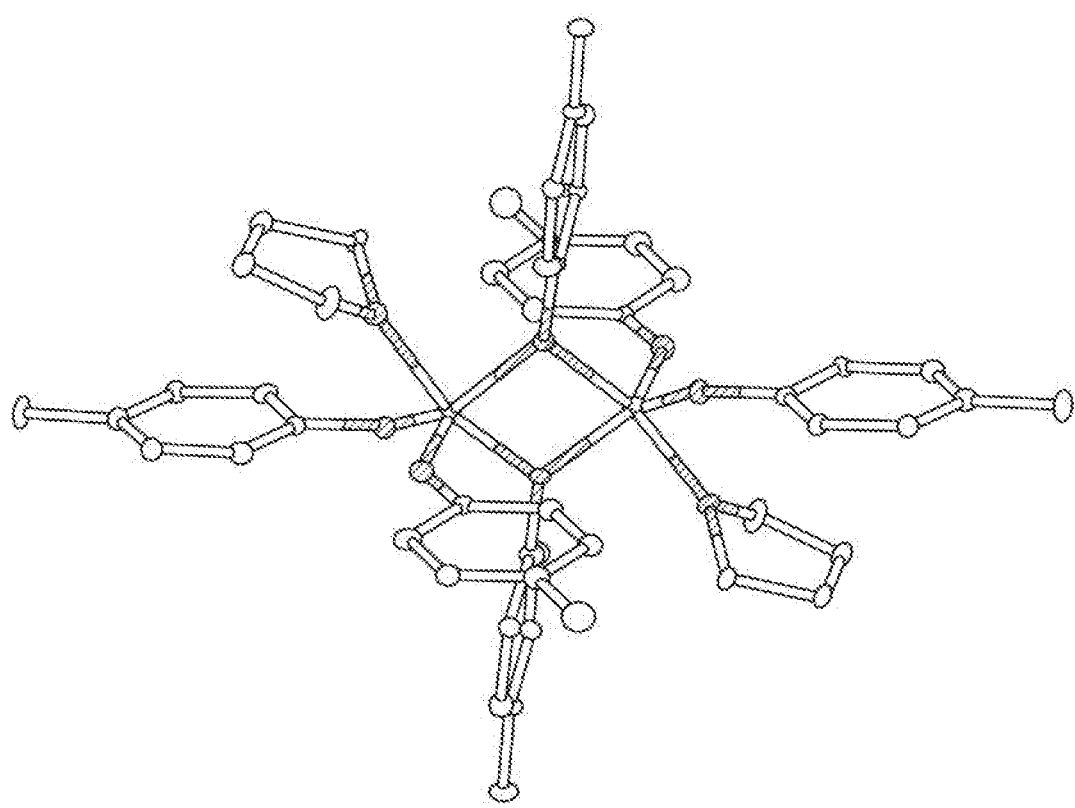
FIG. 2 is the structure of a catalyst ligand precursor according to an embodiment, determined using X-ray single-crystal diffraction.

[(4-MePhO)$_3$Al (THF)]$_2$ preparation—the compound was prepared by reacting AlR$_3$ (e.g., TEAL) toluene solution with 3 eq. 4-MePhOH in toluene solution, drying out solvent to obtained solid compound mixture, and following a 105° C. treatment in THF in a closed reactor to obtain the product. Typical procedure: A solution of 50 g 4-MePhOH (0.462 mol) in 100 m toluene was added dropwise to a solution of 11.13 g TMA (0.154 mol) in 300 mL toluene under intense stirring at ambient temperature and pressure. The addition was done in a controlled fashion to prevent an extensive gas formation and overheating of the reaction mixture. The mixture was stirred at 80° C. for 2 hours after which the solvent was boiled off to give a white product. This product was washed several times with hexane (3×100 mL) and dried in vacuo to yield 56 g. $^1$H NMR shows the presence of another product in the mixture. The obtained white solid was dissolved at 105° C. in THF (500 mL) in a closed high-pressure vessel and the resulting solution was allowed to cool down to RT. Precipitated white crystalline solid was washed several times with hexane (3×50 mL) and dried at 85° C. for 4 hours. 52 g of the targeted product were isolated. A small amount of the crystalline material was analyzed with X-ray single-crystal diffraction and the structure is shown in FIG. 2.

Catalyst Preparation—solid (4-MePhO)$_3$Al (THF) (424 mg, 1.00 mmol) was added to the solution of $WCl_6$ (300 mg, 0.757 mmol) in toluene (10 mL). The resulting mixture was stirred for 2.5 hours at room temperature.

Polymerization—the polymerization protocol is identical to that described above. cC5= 130 mL (100 g) in 300 mL toluene. Reaction temperature: 0° C. Reaction time: 3 hours (viscous after 40 minutes). Conversion: 44%. Cis/Trans ratio: 25/75%, Mw: 601 k, Mw/Mn: 2.08.

Example 2-3-2 (RO=4-MePhO, Polymerization at 21-25° C.)

[(4-MePhO)$_3$Al (THF)]$_2$ preparation—(4-MePhO)$_3$Al (THF) prepared as for Example 2-3-1.

Catalyst Preparation—solid (4-MePhO)$_3$Al (THF) (16 mg, 38 μmol) was added to the solution of $WCl_6$ (15 mg, 38 μmol) in toluene (2 mL) cooled at −35° C. in the freezer in the drybox.

Polymerization—in a vessel cC5= 6.5 mL (5 g) and 10 mL toluene were charged and placed in the freezer of drybox at −35° C. The cold cC5= solution was added ~1 mg neat $Et_3Al$. The cold catalyst solution was then added to the cC5= solution. The reaction temperature was increased from −35° C. to room temperature (~21° C.). After 1 hr, the NMR showed the conversion was 56%. The mixture was allowed to stir overnight. Standard quenching procedure was applied. 1.83 g polymer was isolated. Cis/Trans ratio: 22/78%, Mw: 445 k, Mw/Mn: 2.22.

Examples 2-3-1 and 2-3-2 confirm that aluminum intermediates may be isolated by addition of a donor group, in this case THF. The (4-MePhO)$_3$Al may be readily crystallized as a dimeric five coordinated Al species with one THF for each Al according to the following formula:

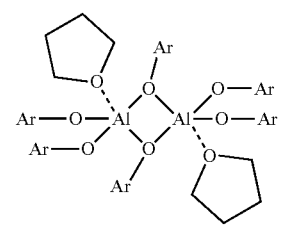

wherein Ar is 4-Mephenyl.

As the Examples confirm, the THF adducts form highly active catalysts when used to construct the active catalyst with $WCl_6$. Although many W compounds can polymerize THF to block or destroy the carbene formation, the molecular level THF present may only alter the metathesis polymerization behavior and yield different polymer structures (different Mw, trans:cis ratio, etc.) with the same ligand structure except with or without the coordinated THF. These examples suggest that other donors may include $Et_2O$, $MeO^tBu$, $NMe_3$, and the like. Polymerization of cyclopentene with $(RO)_2AlR$ (as 2-in-1 ligand precursor and activator)+$WCl_6$.

Example 2-4-1 (RO=4-MePhO, Polymerization at 21-25° C.)

(4-MePhO)2AliBu preparation—a solution of 0.216 g 4-MePhOH in 2 g toluene was added slowly to a solution of 0.20 g TIBAL in 2 g toluene. Shaken it for 15 minutes at room temperature.

Catalyst preparation—the product was added to $WCl_6$ solution (0.20 g in 2 g toluene) and shaken for 15 minutes.

Polymerization—after 24 hours the mixture was added to 50 g cyclopentene, which was purified by passing through a basic alumina column, and stirred for 24 hours. The conversion rate was monitor by NMR, which showed only 8%. The reaction did not proceed well, possibly due to being kept overnight at room temp which might have caused degradation of the active carbene species. The polymer was isolated using standard quenching procedure. Cis:trans=42:58; Mw=670 k; and Mw/Mn (or PDI)=2.3.

Example 2-4-2 (RO=4-MePhO, Polymerization at 21-25° C.)

Repeated Example 2-4-2, but added a drop of TIBAL to reactivate the proposed decomposed catalyst. The activity shows a marked improvement. The polymer was isolated using standard quenching procedure. Conversion: 19% in 1 hour; Cis:trans=40:60; Mw=671 k; and Mw/Mn (or PDI)=1.9.

Example 2-4-1 and Example 2-4-2 show that at room temperature polymerization condition high Mw polymer can be obtained and the cis:trans ratio can be controlled.

Polymerization of cyclopentene with chelating-$A(RO)_2AlCl$+$WCl_6$+Al—R containing activator.

Example 2-5 (A(RO)₂=BBHT without Active Protons, Polymerization at 21° C. to 25° C.

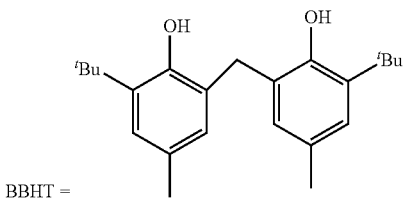 [SMILES: Cc1cc(Cc2cc(C)cc(C(C)(C)C)c2O)c(O)c(C(C)(C)C)c1]

BBHT =

(BBHT)AlCl preparation—in a drybox, a 20 mL vial was charged 0.340 g BBHT (Aldrich, >98.5%, 1.0 mmol) and 2 g toluene. The solution was added slowly to another 20 mL vial containing 0.095 g $Me_2AlCl$ (1.0 mmol) and 2 g toluene and shaken well.

Catalyst preparation—the BBHT solution was added to a $WCl_6$ solution (0.198 g (0.5 mmol) in 2 g toluene) and shaken for 15 minutes.

Polymerization—the catalyst solution was added to 50 g cyclopentene, which was purified by passing through a basic alumina column, and stirred for 3 hours. The conversion rate was monitor by NMR, which showed only 3%. The reaction did not proceed well, possibly due to steric hindrance of the active site by the relatively large size of the two BBHT ligands. The polymer was isolated using standard quenching procedure. Cis:trans=18:82; Mw=623 k; and Mw/Mn (or PDI)=2.21.

Polymerization of cyclopentene with $A(RO)_2Al(OR)$+$MoCl_5$+Al—R containing activator.

Example 2-6 (Al(RO)₂ is BBHT and OR is 2-iPrPhO, Polymerization at −35° C.)

(2-iPrPhO)Al(BBHT) preparation—in the drybox, a 20 mL vial was charged 0.340 g BBHT (Aldrich, >98.5%, 1.0 mmol) and 0.136 g 2-iPrPhOH (1.0 mmol) in 2 g toluene. The solution was added slowly to another 20 mL vial containing 0.114 g $Et_3Al$ (1.0 mmol) and 2 g toluene and shaken well.

Catalyst preparation—the above solution was added to $MoCl_5$ solution (0.273 g (1.0 mmol) in 2 g toluene) and shaken for 15 minutes.

Polymerization—the catalyst solution was added to 50 g cyclopentene, which was purified by passing through a basic alumina column and cooled to −35° C., and stirred for 3 hours. The conversion rate was monitor by NMR, which showed about 1%. The reaction did not proceed well, which is consistent with the possible steric hindrance observed in Example 2-5. These results further suggest that the Mo species is much less active than W. The polymer was isolated using standard quenching procedure. No characterization was done due to an insufficient amount of the polymer product.

As examples 2-5 and 2-6 show, in embodiments a chelating ligand may be employed to force the ligand framework to form a "cis-structure according to the following reaction scheme:

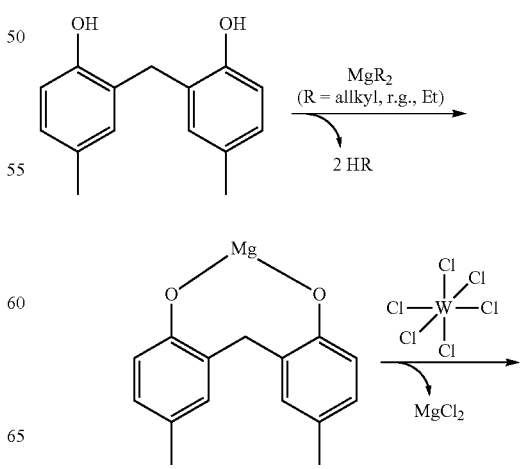

-continued

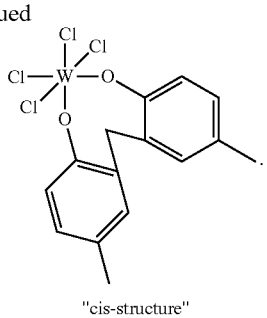

"cis-structure"

This is compared to the formation of a non-chelating ligand have the more abundant "trans-structure"

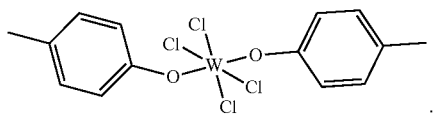

As these examples show, such embodiments allow for control over catalyst activity, the trans:cis ratio of the resulting poly-cyclo-olefins, and/or the resulting polymer molecular weight.

In embodiments, the chelating ligands may be directly reacted with the catalyst precursor, e.g., $WCl_6$, to form the same cis-structure end product without first reacting with the metal alkyl (or hydride) compound. However, such embodiments will result in the formation of harmful HCl gas.

Polymerization of cyclopentene with $Al(OR)_3+WCl_6+$ Al—R containing activator.

Example 2-7-1 (RO=2-iPrPhO, Polymerization at 0° C.)

$Al(2-iPrPhO)_3$ preparation—the solution of 2-iPrPhOH (4.0 g, 29.4 mmol) in toluene (10 mL) was added dropwise to the solution of $Me_3Al$ (0.539 g, 7.5 mmol) in toluene (5 mL) at room temperature. The formation of a white precipitate was observed during the reaction. The suspension was stirred overnight. Formation of a precipitate was not observed. The mixture was stirred for additional 1 hour at 80° C. Volatiles were then removed in vacuo to give a white crystalline solid which was washed with hexane and dried in vacuo. Yield 2.78 g.

Catalyst preparation—solid $Al(2-iPrPhO)_3$ 0.436 g was added to a solution of $WCl_6$ (0.300 g) in toluene (10 mL); stirred for 2.5 hours at room temperature.

Polymerization—To the solution of cC5= (130 mL) in toluene (300 mL); was added neat $AlEt_3$ 0.173 g and cooled to 0° C.; this mixture was added to the cC5= solution under stirring; the mixture became viscous after about 40 minutes reaction time. After 3 hours at 0° C., the reaction mixture was allowed to warm up to room temperature. After 14 hours at room temperature (conversion: 82% by NMR), the solution of BBHT in EtOH (10 mL)/toluene (50 mL) was added. The resulting mixture was added to EtOH (1 L) under intense mechanical mixing. The formed polymer was washed with EtOH (2×500 mL) and dried in vacuo at 50° C. for 4 hours. Isolated yield: 87 g; Cis/Trans ratio: 12/88%; Mw: 389 k; Mw/Mn: 2.07.

Example 2-7-2 (RO=2-iPrPhO, Polymerization at −35° C. to RT)

This examples represents a scaled down repeat experiment of Example 2-6-1 at a reaction temperature of −35° C. No solvent was used for polymerization. 5 g cC5= was found to have 88% conversion after less than 1 hour polymerization at −35° C. (freezer cooling then placing outside freezer, i.e., room temperature). It was likely that the vigorous polymerization caused too fast an increase in the temperature to room temperature, the resultant polymer had a lower Mw of 238 k; Mw/Mn=1.93; cis:trans=26:74.

Polymerization of cyclopentene with $(RO)Na+WCl_6+$ Al—R containing activator.

Example 2-8 (RO=2,6-iPr$_2$PhO, Polymerization at RT)

(2,6-iPr$_2$PhO)Na preparation—NaH was dissolved into 10 g toluene and 2,6-diisopropylphenol was added into 10 g toluene. NaH solution was added to 2,6-diisopropylphenol solution slowly and stirred at room temperature for 15 minutes. The resultant reaction product was filtered to obtain the solid sodium alkoxide. The solid was washed with hexane and dried under vacuum. Yield: 1.42 g.

Catalyst preparation—1.0 g of the solid sodium alkoxide was added slowly to the solution of $WCl_6$ 0.413 g in 10 g toluene and heated to 80° C. for 60 minutes.

Polymerization—a round bottom flask was charged with 50 g of cyclopentene and 0.198 g of TIBAL ($WCl_6$:TIBAL=1:1) as the activator. The $WCl_6$ reaction mixture was added to the flask slowly and the mixture stirred at room temperature for 1 hour. Standard workup procedures gave a yield of 2 g (4% in 60 min), trans:cis ratio is 73:27.

As these examples confirm, the active catalyst may be produced without the formation of harmful byproducts, which include HCl and other materials detrimental to the process and potentially detrimental to the environment. In the examples, an alcohol used to form a ligand of the transition metal compound is first converted into a metal alkoxide (R—OH to a R—O-M species wherein M is a group 1, 2, or 13 metal, e.g., Na, Mg, or Al) In such embodiments the formation of harmful byproducts is eliminated, such as the elimination of HCl or $Cl_2$ in the following equation:

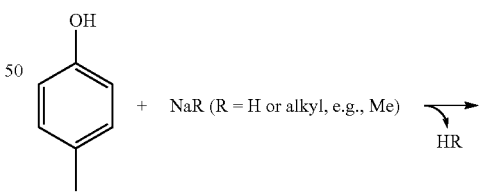

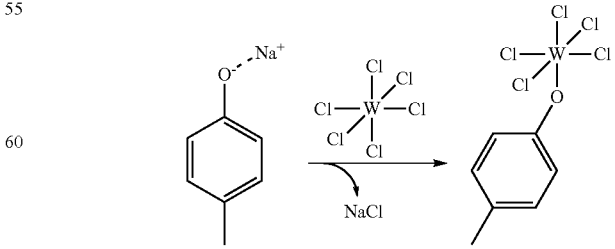

In addition, these examples suggest a Grignard intermediate may be used, e.g., RMgX, wherein X=halide and R=$C_1$-$C_{20}$ alkyl. For example, Grignard agent RMgCl, R=$C_1$-$C_{20}$ alkyl may be used to convert the alcohol into an intermediate, which is then reacted with the transition metal compound according to the following reaction scheme:

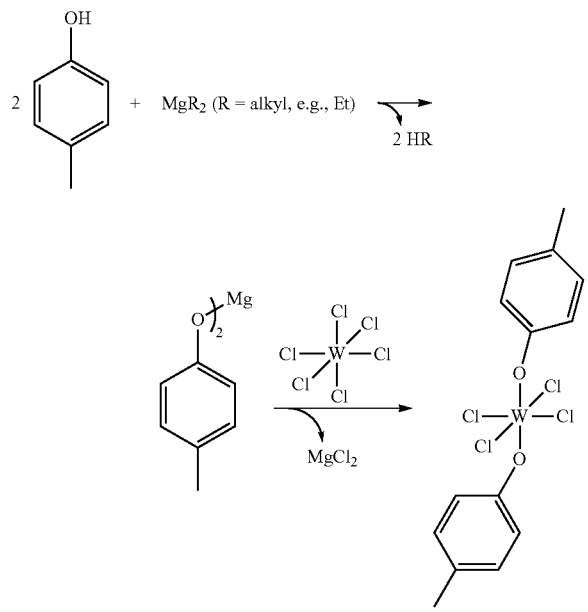

As the examples further confirm, an alkyl aluminum compound may be used (e.g., $AlR_2X$ or $AlRX_2$, wherein X is halide and R is $C_1$-$C_{20}$ alkyl) to convert the alcohol into an intermediate, which is then reacted with the transition metal compound according to the following reaction scheme:

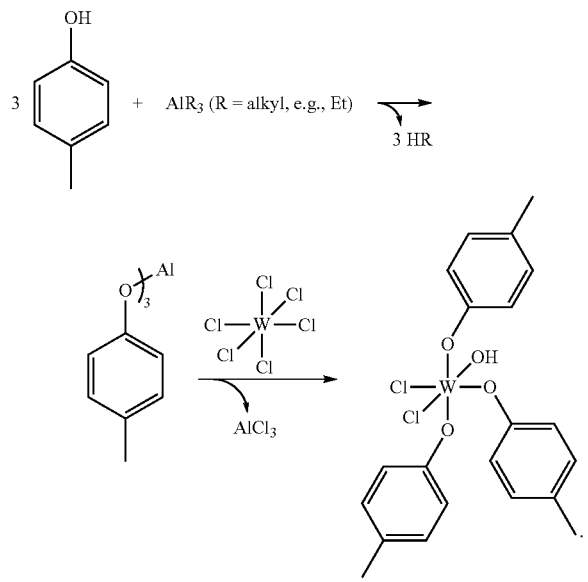

Silica Supported Catalyst Formation and Polymerization.

Example 3-1-1 demonstrates the route to form the silica supported W=CHR active carbene species from high temperature prepared silica as shown below.

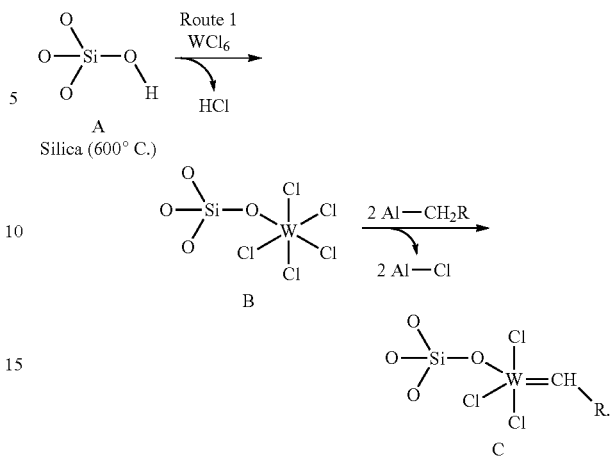

A suspension of silica PQ ES70 (0.5 g, calcinated at 600° C., about 0.6 mmol OH/g) in DCM (10 mL) was reacted with $WCl_6$ (0.2 g) at room temperature for 2 hours. Supported silica was collected by filtration and washed in DCM (5×10 mL), then dried in vacuo to obtain the solid powder of supported catalyst. 0.1 g supported catalyst was mixed with 5 g cC5= at room temperature in a 20 mL vial. A drop of TEAL was added to the mixture and shaken well on a shaker. The mixture became viscous after 1 hour. The mixture was filtered through a glass frit and the solid was washed with DCM. The filtrate was dried in vacuo to obtain 0.2 g polymer (conversion 4%). The polymerization was repeated by mixing the solid with 5 g cC5= in another 20 mL vial, which was shaken for 2 hours. The mixture was filter through a similar glass frit and the solid was washed with DCM. The filtrate was dried in vacuo to obtain 0.2 g polymer (conversion 4%).

Example 3-1-2 demonstrates the alternative route to form the silica supported W=CHR active carbene species from high temperature prepared silica shown below.

Quantitative Test based on Route II A-D-E-F-G
A-D-E Formation.

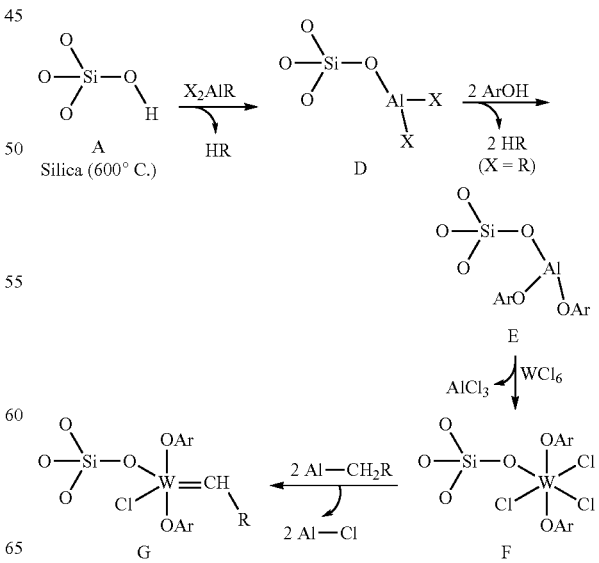

A suspension of silica (2 g, calcinated at 600° C., ~0.6 mmol OH/g) in toluene (20 mL) reacted with TEAL (AlRX$_2$=AlEt$_3$) at room temperature for 1 hour. Solid 4-Me-PhOH (Ar=4-MePh-) was then added and the mixture was stirred for 40 minutes at 70° C. The treated silica was filtered and washed with hexane. Yield: 2.23 g. (AC6654)

Catalyst preparation—the treated silica 64 mg was added to a solution of WCl$_6$ (0.154 g) in toluene (2 mL); stirred for 1.5 hours at room temperature then cool down to −35° C.

Polymerization—a solution of cC5= (5 g) in toluene (25 mL) was cooled to the temperature of −35° C.; neat TEAL (17 mg) was added to the mixture. The cooled treated silica suspension was added to the mixture under vigorous stirring. The temperature was allowed to rise up to room temperature; the reaction mixture was filtered after 40 minutes reaction time and the cyclopentene was removed under a stream of N2 to isolate 0.37 g polymer (contains small amount of toluene):cis:trans ratio 17:83; Mw 309 k; PDI 2.39.

The remaining catalyst removed by filtration was washed 4 times with toluene (5 mL each) and added to a new portion of cyclopentene (5 mL). After stirring for 3 hours at room temperature the conversion was measured at 4%, insufficient product prevented further characterization.

In these two examples a "high temperature" calcined silica is employed wherein the silica or other support is calcined at temperatures greater than about 600° C. These examples further demonstrate synthetic pathways which eliminate the formation of HCl by first converting the Si—OH groups into the metalated support Si—O-M, wherein M is a Group 1, 2, or 13 element. In these examples, the aluminum analog is formed as shown above. The metalated support is then contacted with the catalyst precursor, e.g., WCl$_6$, to form the supported catalyst.

The two examples above further demonstrate that polypentenamer product can be separated from the supported catalyst and the quenching and product precipitation to isolating catalyst steps can be eliminated. The samples further confirm that the catalyst can be used in a continuous process wherein the catalyst is recycled and optionally reactivated along with any unreacted monomer. The examples further confirm that the monomer may be used as the solvent.

Self-Supported Catalyst Formation and Polymerization.

Example 4-1 (Al—X-Bridging Bisphenol a Polymer as Self-Supported W Catalyst)

The self-supported catalyst example was prepared according to the following reaction scheme:

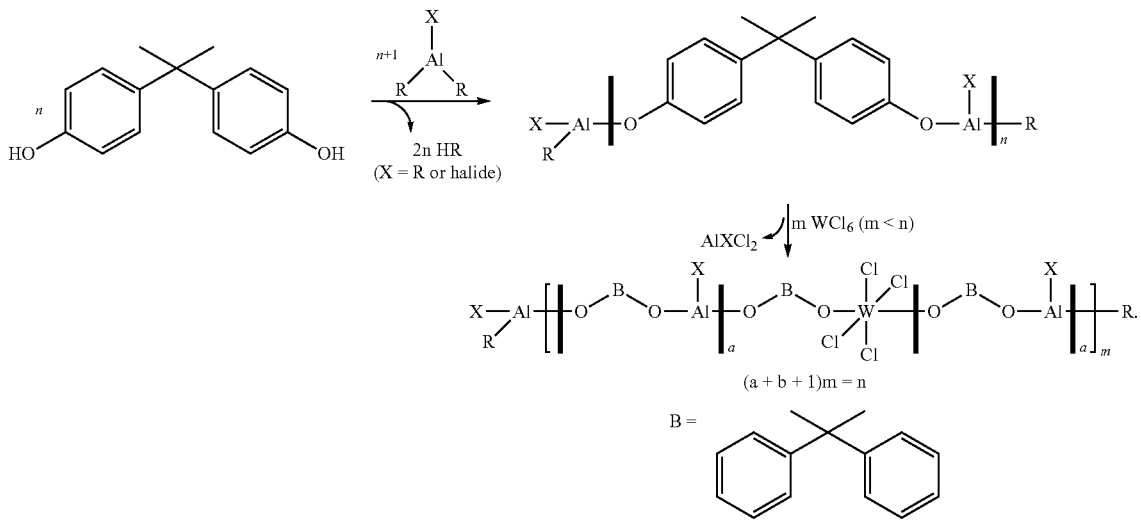

0.72 g (9.9 mmol) TMA (=R$_2$AlX, R=X=Me) and 5 g toluene were charged into a 40 mL vial; 2.20 g (9.6 mmol). 10 g of bisphenol A in toluene (not totally dissolved) was charged in to a 20 mL vial. The bisphenol A slurry was added slowly to the TMA solution. Because the reaction was slow, the bisphenol A could be added as solid. After all the bisphenol A was added, the resulting mixture was heated at 90° C., the slurry became viscous and then solidified as a foam and the volume noticeably increased. Approximately 1/10 of the wet solid was mixed with ~0.05 g WCl$_6$ and 5 g cC5= without additional Al—R activator and the mixture was shaken at RT. An apparent viscosity increase was observed after 15 minute reaction time. After 24 hours, the entire reaction mixture had solidified.

The example confirms that a self-supported catalyst according to embodiments disclosed herein can be formed. In this example, non-chelating organic multi-alcoholic compounds are reacted with catalyst precursors to form a solid self-supported catalyst. The non-chelating dihydroxy compound (bis-phenol A) used to form the polymeric support has a low in solubility in non-polar organic solvents, which is required for ROMP polymerization. In this example, the 4,4' bis-phenol compound (bis-phenol A) was employed since the placement of the two hydroxyls render the compound unsuitable for forming chelates of the transition metal:

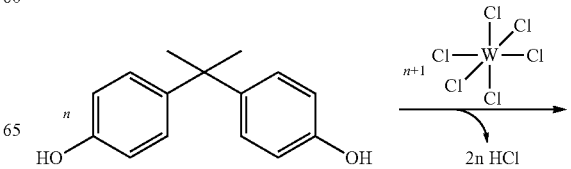

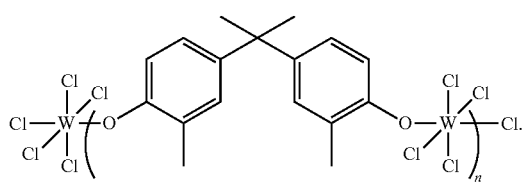

The example suggests non-chelating organic multi-alcoholic compounds which may be suitable for use include, but are not limited to, other bi-alcoholic, and/or tri-alcoholic or poly-alcoholic compounds, and/or mixtures of these compounds. Examples include:

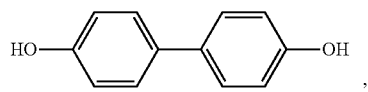

,

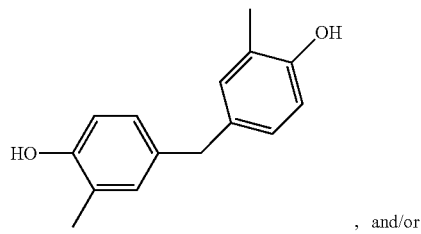

, and/or

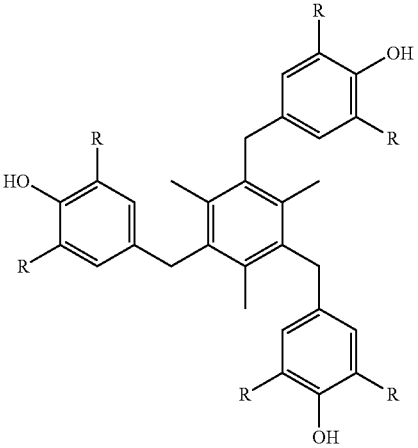

(R = $C_1$ to $C_4$ alkyl), and the like.

In embodiments, mono-alcoholic ligand, e.g., 4-MePhOH, may be used with the bi- and/or tri-alcoholic compounds, as support termination agents. These mono-hydroxyl compounds are employed to control the molecular weight of the self-support polymeric compound, i.e., used as a polymer end-point to regulate the support chain length.

This example serves as an evidence that polymeric non-chelating multi-alcoholic compound can form with aluminum alkyl served as bridging groups. The W active species can form on the support that serves also as the ligand precursor (Bisphenol A) and activator (aluminum alkyl bridge).

All polymerization results are summarized in Table 2.

TABLE 2

Cyclopentene Polymerization Results

| | Monomer/Polymer | | Reaction Conditions | | | Polymer Properties | | | Catalyst | | |
|---|---|---|---|---|---|---|---|---|---|---|---|
| | Charge/ | Yld | T | t | | Mw (k) | PDI | Trans:Cis $^{13}$C | | | |
| Run ID | Yield (g) | (%) | (° C.) | min | Solvent | GPC | GPC | NMR | $MCl_n$ | RO—X | $AlX_3$ |
| CEx 1-1 | 1150/580 | 50 | 30 | 240 | Benzene | 412 | 2.16 | 83/17 | $WCl_6$ | $Me_3COCl$ | $Al^iBu_3$ |
| CEx 1-2 | 960/770 | 80 | 0 | 180 | Benzene | 594 | 2.24 | 81/19 | $WCl_6$ | $Me_3COCl$ | $Al^iBu_3$ |
| CEx 1-3 | 848/170 | 20 | 30 | 300 | Benzene | 220 | 4.29 | 80/20 | $WCl_6$ | $Me_3COCl$ | $Al^iBu_3$ |
| CEx 1-4 | 1000/510 | 51 | 0 | 240 | Hexane | 331 | 2.47 | 80/20 | $WCl_6$ | $Cl_5C_6OH$ | $AlEtCl_2$ |
| CEx 1-5 | 1080/800 | 74 | 5 | 90 | Toluene | 661 | 2.38 | 74/26 | $WCl_6$ | 2-$^i$PrPhOH | $AlEt_3$ |
| Ex 1-6 | 1000/500**** | 50 | 5 | 90 | Toluene | 337 | 2.11 | 89/11 | $WCl_6$ | 2,6-$Me_2$PhOH | $AlEt_3$ |
| CEx 1-7 | 350/28 | 8 | −30 | 180 | Non | 339 | 9.6 | <1/>99 | $MoCl_5$ | Non | $AlEt_3$ |
| Ex 2-1-1 | 91/58.3 | 64 | 0 | 180 | Toluene | 493 | 2.00 | 85/15 | $WCl_6$ | (2-$^i$PrPhO)$_2$AlCl | $AlEt_3$ |
| Ex 2-1-2 | 208/160 | 77 | 0 | 180 | Toluene | 218 | 1.78 | 86/14 | $WCl_6$ | (2-$^i$PrPhO)$_2$AlCl | $AlEt_3$ |
| Ex 2-1-3 | 4.18/3.81 | 91 | 21 | 180 | Toluene | 193 | 1.99 | 84/16 | $WCl_6$ | (2-$^i$PrPhO)$_2$AlCl | $AlEt_3$ |
| Ex 2-2 | 252/227 | 90 | 0 | 180 | Toluene | 315 | 1.75 | 84/16 | $WCl_6$ | (4-MePhO)$_2$AlCl | $AlEt_3$ |
| Ex 2-3-1 | 97.5/42.9 | 44 | 0 | 180 | Toluene | 601 | 2.08 | 75/25 | $WCl_6$ | (4-MePhO)$_3$Al•THF | $AlEt_3$ |
| Ex 2-3-2 | 5/1.8 | 56* | −35/21 | 60 | Toluene | 445 | 2.22 | 78/22 | $WCl_6$ | (4-MePhO)$_3$Al•THF | $AlEt_3$ |
| Ex 2-4-1 | 50/4.0 | 8 | 21 | 24 h | Non | 670 | 2.3 | 58/42 | $WCl_6$ | (4-MePhO)$_2$Al$^i$Bu | Non |
| Ex 2-4-2 | 50/9.5 | 19 | 21 | 60 | Non | 671 | 1.9 | 60/40 | $WCl_6$ | (4-MePhO)$_2$Al$^i$Bu | $Al^iBu_3$ |
| Ex 2-5 | 50/6 | 3 | 21 | 180 | Non | 623 | 2.21 | 82/18 | $WCl_6$ | (BBHT)AlCl | $Al^iBu_3$ |
| Ex 2-6 | 5/<1 | <1* | −35/21 | 24 hr | Non | — | — | — | $MoCl_5$ | 2-$^i$PrPhOAlBBHT | $AlEt_3$ |
| Ex 2-7-1 | 106/87 | 82 | 0 | 180 | Toluene | 389 | 2.07 | 88/12 | $WCl_6$ | (2-$^i$PrPhO)$_3$Al | $AlEt_3$ |
| Ex 2-7-2 | 5/4.4 | 88* | −35/21 | <1 | Non | 238 | 1.93 | 74/26 | $WCl_6$ | (2-$^i$PrPhO)$_3$Al | $AlEt_3$ |
| Ex 2-8 | 50/2 | 4 | 21 | 60 | Non | — | — | 73/27 | $WCl_6$ | 2,6-$^i$Pr$_2$PhONa | $Al^iBu_3$ |
| Ex 3-1-1 | 5/0.2 | 4 | 21 | 60 | Non | — | — | — | $WCl_6$ | Silica-OH | $AlEt_3$ |
| Ex 3-1-2 | 5/0.37 | 7 | −35/21 | 40 | Non | 309 | 2.39 | 83/17 | $WCl_6$ | Silica-OH | $AlEt_3$ |
| Ex 4-1 | 5/>4 | >80** | 21 | 24 h | Non | — | — | — | $WCl_6$ | Bisphenol A | Al—Me*** |

*Conversion determined by NMR for the reaction mixture;
**estimated based on viscosity;
***Moiety on AlMe3/Bisphenol A derived polymer;
****1-hexene (C6=) added: cC5=:C6= is 2000:1

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

We claim:

1. A supported Ziegler Natta (ZN) catalyst composition comprising a transition metal carbene comprising moieties having the general formulae (F6):

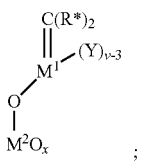

(F6)

where $M^1$ is a Group 5 or a Group 6 metal of the periodic table of valence v;

each R* is independently hydrogen or a $C_1$ to $C_8$ alkyl radical;

each Y is $OR^5$, wherein each $R^5$ is para-methylphenyl group; and $M^2O_x$ is a metal oxide support selected from silica, alumina, titania, or a combination thereof.

2. The supported Ziegler Natta catalyst according to claim 1, comprising moieties having the general formula (F6), wherein $M^2O_x$ comprises silica, wherein the silica has been heat treated at a temperature greater than or equal to 600° C. to form isolated hydroxyl groups on a surface such that the silica support further comprises moieties having the general formula:

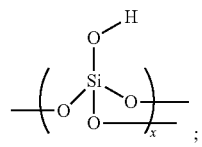

wherein x is greater than 1.

* * * * *